US009584393B2

(12) United States Patent
Kjendal et al.

(10) Patent No.: US 9,584,393 B2
(45) Date of Patent: Feb. 28, 2017

(54) DEVICE AND RELATED METHOD FOR DYNAMIC TRAFFIC MIRRORING POLICY

(71) Applicant: Extreme Networks, Inc.

(72) Inventors: David Kjendal, Salem, NH (US); Markus Nispel, Salem, NH (US); Richard Graham, Salem, NH (US)

(73) Assignee: Extreme Networks, Inc., San Jose, CA (US)

( * ) Notice: Subject to any disclaimer, the term of this patent is extended or adjusted under 35 U.S.C. 154(b) by 131 days.

(21) Appl. No.: 13/835,679

(22) Filed: Mar. 15, 2013

(65) Prior Publication Data
US 2014/0280887 A1 Sep. 18, 2014

(51) Int. Cl.
 H04L 12/26 (2006.01)
 H04L 29/08 (2006.01)
(52) U.S. Cl.
 CPC .......... H04L 43/12 (2013.01); H04L 29/0854 (2013.01)
(58) Field of Classification Search
 CPC ... H04L 63/1416; H04L 43/026; H04L 43/12; H04L 63/0263; H04L 43/04; H04L 63/1408; H04L 12/2602; H04L 43/00; H04L 63/00; H04L 63/0227; H04L 63/0236; H04L 43/028; H04L 45/02; H04L 12/26; H04L 29/08; H04L 29/0854; G06F 21/577
 USPC .......... 709/218, 223, 224, 225, 229
 See application file for complete search history.

(56) References Cited

U.S. PATENT DOCUMENTS

| | | | |
|---|---|---|---|
| 6,041,042 A * | 3/2000 | Bussiere | H04L 12/24 370/245 |
| 6,128,654 A | 10/2000 | Runaldue et al. | |
| 6,157,967 A | 12/2000 | Horst et al. | |
| 6,839,349 B2 | 1/2005 | Ambe et al. | |
| 6,976,055 B1 | 12/2005 | Shaffer et al. | |
| 7,002,977 B1 * | 2/2006 | Jogalekar | H04L 45/00 370/389 |
| 7,020,139 B2 | 3/2006 | Kalkunte et al. | |
| 7,188,292 B2 * | 3/2007 | Cordina et al. | 714/748 |
| 7,249,191 B1 | 7/2007 | Hutchison et al. | |

(Continued)

FOREIGN PATENT DOCUMENTS

WO  WO 01/63838  8/2001

OTHER PUBLICATIONS

PCT International Search Report and Written Opinion for corresponding PCT application serial No. PCT/US2014/026063, Oct. 10, 2014, 17 pp.

*Primary Examiner* — Sargon Nano
(74) *Attorney, Agent, or Firm* — Ropes & Gray LLP

(57) ABSTRACT

A function is provided in a network system for policy-based dynamic mirroring for network traffic. The function monitors events, topology and status of the network and installs, enables, selects or changes traffic mirrors associated with the operation of one or more devices of the network. The mirror policies are established based on network polices and/or rules. The mirror policies and the enablement, installation, selection or changing of them are based on multiple criteria. The function provides for the selection of traffic to mirror, how much of it to mirror, where to mirror it and when to stop the mirroring. The function may be established in network entry devices as well as core switching devices of the network. The function can select portals for the mirroring activity and can secure the mirroring.

30 Claims, 17 Drawing Sheets

(56) References Cited

U.S. PATENT DOCUMENTS

| | | | |
|---|---|---|---|
| 7,292,573 B2 * | 11/2007 | LaVigne | H04L 43/028 370/390 |
| 7,328,451 B2 | 2/2008 | Aaron | |
| 7,391,739 B1 | 6/2008 | Taylor et al. | |
| 7,486,674 B2 | 2/2009 | Regan | |
| 7,690,040 B2 * | 3/2010 | Frattura | G06F 21/6263 713/193 |
| 7,720,980 B1 * | 5/2010 | Hankins | H04L 41/0896 709/224 |
| 7,730,237 B1 | 6/2010 | Veprinsky et al. | |
| 7,796,596 B2 * | 9/2010 | Sheppard | H04L 29/06 370/370 |
| 7,832,010 B2 | 11/2010 | Higashikado et al. | |
| 7,860,006 B1 | 12/2010 | Kashyap et al. | |
| 7,882,554 B2 * | 2/2011 | Kay | H04L 63/1416 370/230 |
| 7,944,822 B1 | 5/2011 | Nucci et al. | |
| 7,948,889 B2 | 5/2011 | Lalonde et al. | |
| 8,054,833 B2 | 11/2011 | Jorgensen et al. | |
| 8,078,813 B2 | 12/2011 | LeCrone et al. | |
| 8,095,683 B2 | 1/2012 | Balasubramaniam Chandra | |
| 8,161,252 B1 | 4/2012 | Case et al. | |
| 8,185,663 B2 * | 5/2012 | Cochran et al. | 709/250 |
| 8,239,960 B2 * | 8/2012 | Frattura | G06F 21/6263 707/999.204 |
| 8,255,996 B2 * | 8/2012 | Elrod | H04L 63/0227 370/245 |
| 8,291,495 B1 | 10/2012 | Burns et al. | |
| 8,302,180 B1 | 10/2012 | Gudov et al. | |
| 8,307,115 B1 * | 11/2012 | Hughes | 709/238 |
| 8,346,918 B2 * | 1/2013 | Kay | 709/224 |
| 8,380,979 B2 | 2/2013 | Aaron et al. | |
| 8,401,007 B2 | 3/2013 | Thavisri | |
| 8,452,276 B2 * | 5/2013 | Lauer | 455/431 |
| 8,693,353 B2 | 4/2014 | Long et al. | |
| 8,767,549 B2 | 7/2014 | Kashyap et al. | |
| 8,793,361 B1 * | 7/2014 | Riddle | H04L 47/2441 709/224 |
| 8,819,213 B2 * | 8/2014 | Frattura | H04L 12/2602 709/223 |
| 8,850,591 B2 | 9/2014 | Ahuja et al. | |
| 8,856,920 B2 | 10/2014 | Khan et al. | |
| 8,862,541 B1 | 10/2014 | Cox et al. | |
| 2001/0055274 A1 * | 12/2001 | Hegge | H04L 12/2602 370/229 |
| 2002/0035681 A1 * | 3/2002 | Maturana | H04L 63/0428 713/151 |
| 2004/0003094 A1 | 1/2004 | See | |
| 2004/0054766 A1 | 3/2004 | Vicente | |
| 2004/0078418 A1 | 4/2004 | Law et al. | |
| 2004/0083299 A1 * | 4/2004 | Dietz | G06F 17/30985 709/230 |
| 2004/0210677 A1 * | 10/2004 | Ravindran | G06F 3/0613 710/1 |
| 2004/0260736 A1 * | 12/2004 | Kern | G06F 11/2058 |
| 2005/0220092 A1 | 10/2005 | LaVigne et al. | |
| 2005/0249125 A1 | 11/2005 | Yoon et al. | |
| 2005/0278565 A1 * | 12/2005 | Frattura et al. | 714/5 |
| 2006/0036904 A1 * | 2/2006 | Yang | 714/7 |
| 2006/0059163 A1 * | 3/2006 | Frattura | H04L 12/2602 |
| 2006/0239219 A1 | 10/2006 | Haffner et al. | |
| 2007/0056028 A1 * | 3/2007 | Kay | 726/11 |
| 2007/0150950 A1 * | 6/2007 | Aaron | H04L 63/00 726/22 |
| 2008/0059631 A1 | 3/2008 | Bergstrom et al. | |
| 2008/0141379 A1 | 6/2008 | Schmelzer | |
| 2008/0148381 A1 | 6/2008 | Aaron | |
| 2008/0163333 A1 * | 7/2008 | Kasralikar | 726/1 |
| 2008/0239961 A1 | 10/2008 | Hilerio et al. | |
| 2008/0240128 A1 * | 10/2008 | Elrod | H04L 12/64 370/401 |
| 2008/0247663 A1 | 10/2008 | Jacobsen | |
| 2010/0268933 A1 | 10/2010 | Frattura et al. | |
| 2012/0069744 A1 * | 3/2012 | Krzanowski | H04L 12/2881 370/252 |
| 2012/0269087 A1 * | 10/2012 | Guo | H04L 45/04 370/252 |
| 2013/0086399 A1 | 4/2013 | Tychon et al. | |
| 2013/0216094 A1 | 8/2013 | DeLean | |
| 2013/0298191 A1 | 11/2013 | Hoole et al. | |
| 2014/0280211 A1 | 9/2014 | Rash et al. | |
| 2014/0280889 A1 | 9/2014 | Nispel et al. | |

* cited by examiner

| Group | Application | Signature based score | Heuristics based score | API | Other Methods |
|---|---|---|---|---|---|
| Social | Facebook | 90 | 20 | 0 | 0 |
| | Twitter | 90 | 0 | 0 | 0 |
| | G+ | 60 | 20 | 0 | 0 |
| | LinkedIn | 90 | 0 | 0 | 0 |
| Security | SSH | 70 | 0 | 0 | 0 |
| | OpenVPN | 10 | 90 | 0 | 0 |
| | IPSEC | 90 | 0 | 0 | 0 |
| | Metasploit | 30 | 30 | 0 | 0 |
| | Luhn Credit Card | 0 | 0 | 80 | 0 |
| Gaming | Diablo III | 40 | 20 | 0 | 0 |
| | Online poker | 80 | 20 | 0 | 0 |
| | League of legends | | 0 | 0 | 0 |
| | Call of duty | | 0 | 0 | 0 |
| | Battlefield 3 | | 0 | 0 | 0 |
| | Halo 4 | | 0 | 0 | 0 |
| | Boarderlands 2 | | 0 | 0 | 0 |
| | Assassins Creed 3 | | 0 | 0 | 0 |
| DataBase | Oracle | 60 | 0 | 0 | 0 |
| | SQL | 80 | 0 | 0 | 0 |
| | Postgres | 80 | 0 | 0 | 0 |
| Peer-to-Peer | Bittorrent | 10 | 80 | 0 | 0 |
| | eDonkey | 20 | 80 | 0 | 0 |

FIG. 4A

| Group | Application | Signature based score | Heuristics based score | API | Other Methods |
|---|---|---|---|---|---|
| Search | Google | 90 | 0 | 0 | 0 |
|  | Yahoo | 90 | 0 | 0 | 0 |
|  | Bing | 90 | 0 | 0 | 0 |
|  | Ask | 90 | 0 | 0 | 0 |
| Software Updates | Sophos Virus update | 50 | 10 | 0 | 0 |
|  | ESET Virus update | 70 | 10 | 0 | 0 |
|  | MalWare Virus update | 0 | 0 | 0 | 0 |
|  | other Virus update | 0 | 0 | 0 | 0 |
|  | Microsoft OS updates | 80 | 0 | 0 | 0 |
|  | Lunix Patches | 80 | 0 | 0 | 0 |
| Web Apps | Google Mail | 80 | 0 | 0 | 0 |
|  | Google Maps | 80 | 10 | 0 | 0 |
|  | Flickr | 90 | 0 | 0 | 0 |
|  | SSL Certificate | 90 | 0 | 0 | 0 |
|  | Weather | 80 | 0 | 0 | 0 |
|  | Road Traffic | 80 | 0 | 0 | 0 |
| Network Infrastructure | DNS | 90 | 0 | 0 | 0 |
|  | SMTP | 95 | 0 | 0 | 0 |
|  | Radius | 70 | 0 | 0 | 0 |
|  | OSPF | 90 | 0 | 0 | 0 |
|  | RIP | 90 | 0 | 0 | 0 |
|  | VRRP | 90 | 0 | 0 | 0 |
|  | GRE | 0 | 0 | 70 | 0 |

FIG. 4B

| Group | Application | Signature based score | Heuristics based score | API | Other Methods |
|---|---|---|---|---|---|
| Custom | local protocols | 0 | 0 | 0 | 0 |
| Layer 2 Protocols | Spanning Tree | 0 | 0 | 0 | 50 |
| | BootP | 0 | 0 | 0 | 50 |
| | AoE Ethernet Storage | 0 | 0 | 0 | 80 |
| | ARP | 0 | 0 | 0 | 95 |
| IPv6 | Routing | 0 | 0 | 0 | 50 |
| | Data transfer | 0 | 0 | 0 | 50 |

FIG. 4C

DEVICE AND RELATED METHOD FOR DYNAMIC TRAFFIC MIRRORING POLICY

CROSS REFERENCE TO RELATED APPLICATIONS

This application is related to the following applications owned by a common assignee and all of which were filed on the same date as the present application. All are incorporated herein by reference. The related applications are identified by title and corresponding serial number as follows: A DEVICE AND RELATED METHOD FOR DYNAMIC TRAFFIC MIRRORING, Ser. No. 13/834,815, A DEVICE AND RELATED METHOD FOR ESTABLISHING NETWORK POLICY BASED ON APPLICATIONS, Ser. No. 13/836,048, A DEVICE AND RELATED METHOD FOR APPLICATION IDENTIFICATION, Ser. No. 13/836,195, A SYSTEM AND RELATED METHOD FOR NETWORK MONITORING AND CONTROL BASED ON APPLICATIONS, Ser. No. 13/836,371, and A DEVICE AND RELATED METHOD FOR SCORING APPLICATIONS RUNNING ON A NETWORK, Ser. No. 13/836,545.

BACKGROUND OF THE INVENTION

1. Field of the Invention

The present invention relates to computer-based networks and their components. More particularly, the present invention relates to use, operation and control of the network.

2. Description of the Prior Art

Interconnected computing systems having some sort of commonality form the basis of a network. A network permits communication or signal exchange through packet forwarding among computing systems of a common group in some selectable way. The interconnection of those computing systems, as well as the devices that regulate and facilitate the exchange among the systems, represent a network. Further, networks may be interconnected together to establish internetworks. For purposes of the description of the present invention, the devices and functions that establish the interconnection represent the network infrastructure. The users, computing devices and the like that use that network infrastructure to communicate are referred to herein as attached functions and will be further defined. The combination of the attached functions and the network infrastructure will be referred to as a network system.

The process by which the various computing systems of a network or internetwork communicate is generally regulated by agreed-upon signal exchange standards and protocols embodied in network interface cards or circuitry and software, firmware and microcoded algorithms. Such standards and protocols were borne out of the need and desire to provide interoperability among the array of computing systems available from a plurality of suppliers. Two organizations that have been responsible for signal exchange standardization are the Institute of Electrical and Electronic Engineers (IEEE) and the Internet Engineering Task Force (IETF). In particular, the IEEE standards for internetwork operability have been established, or are in the process of being established, under the purview of the IEEE 802 committee on Local Area Networks (LANs) and Metropolitan Area Networks (MANs). The IEEE standards include many well defined methods of wired, fiber optic and Radio Frequency (RF or wireless) methods of network communications and are well known to those skilled in the art.

Access to applications, files, databases, programs, and other capabilities associated with the entirety of a discrete network is restricted largely based on the identity of the user and/or the network attached functions. For the purpose of the description of the present invention, a "user" is a human being who interfaces via a computing device with the services associated with a network. For further purposes of clarity, a "network attached function" or an "attached function" may be a user connected to the network through a computing device and a network interface device, an attached device connected to the network, a function using the services of or providing services to the network, or an application associated with an attached device. Upon authentication or other form of confirmation of the offered attached function identity, the attached function may access network services at the level permitted for that identification. For purposes of the present description, "network services" include, but are not limited to, access, Quality of Service (QoS), bandwidth, priority, computer programs, computer applications, databases, files, and network and server control systems that attached functions may use or manipulate for the purpose of conducting the business of the enterprise employing the network as an enterprise asset.

A network administrator grants particular permissions to particular attached functions by establishing network use policies which are enforced at various points in the network. A network policy is an action (or nonaction) to be undertaken based on the existence or occurrence of a defined condition or event. An "event" for purposes of describing the present invention, is a detectable or discernible occurrence that may be considered to have an impact on network operations or performance. Events may be defined by the network administrator. Some events warrant the undertaking of an action to respond, address or otherwise account for those events. Events that warrant the undertaking of some action may be referred to herein as "triggers." Examples of events that may be trigger events include, but are not limited to, time outs, link changes up or down, link speed changes, user changes, device changes, device additions, network service changes, access device changes, location changes, Intrusion Detection System (IDS) or Firewall events, application access requests, priority change requests, protocol changes, the addition of a wireless access user, policy changes made, bandwidth changes, routing link changes, changes of monitored conditions, local and remote policy changes and network system changes. More generally for purposes of the description of the present invention, a "trigger" is any detected or observed event, activity, occurrence, information or characteristic identified in a network system by the network administrator as being of interest for the purpose of making a modification to an assigned set of policies. The types of triggers that define usage restrictions may be of any type of interest to the network administrator. Network policies are generally directed to administration, management, and/or control of access to or usage of network services. A network policy may also be a policy abstraction that is the translation of one or more network policies to a different level of abstraction. For example, multiple network use policies may be bundled into a higher-level abstract network policy for ease of handling and naming; a network policy set is simply a policy composed of one or more policies.

The network policies are typically defined in and regulated through a network policy server device of the network infrastructure controlled by the administrator. The established policies are transmitted to network interface devices of the network infrastructure, referred to herein as packet forwarding devices, at a point of connection to an attached function. That connection point is referred to herein as a port of the packet forwarding device. As part of the authentication process, a particular set of policies are established by the administrator for that attached function. That is, the port at which that attached function is attached to the packet forwarding device is configured to effect those policies, often by installing other policies or installing or enabling a set of rules for the policy. For example, QoS, bandwidth, and priority levels may be set at certain values for one identified attached function and at different levels for another attached function.

A network session is the establishment of an association between an attached function and one or more network services through the network infrastructure. The session includes a series of electronic signal exchanges referred to as packets and one or more packets to the same destination is typically referred to as a flow. It is to be understood that a network system may be embodied in the combination or interrelation between one or more attached functions and one or more network infrastructure devices. At the outset of a network session, often in relation to the authentication of the attached function seeking to initiate the session, an association is created between the session and one or more network services, constrained by one or more network policies established by the administrator through a network control manager device such as the network policy server and carried out or enforced by one or more of the packet forwarding devices of the network infrastructure.

Access to network services may be limited by conditions other than attached function user authentication. For example, an attached function seeking usage of a discrete network system through virtual private networking may be isolated from certain network services simply because private network entry is made through a public portal such as the internet. It is also understood that in certain settings offering wireless connectivity, network usage may be limited upon detection of attached function attempts to seek unauthorized access to specified restricted network services. However, these isolated efforts at network user control based on something other than user identification authentication are insufficient for complete network control and security. What is needed is a comprehensive and integrated system for controlling network usage for all users and devices at all times and to allow users to access the network services from alternate or unknown devices or device types. Additionally, authorized users may at times use the network in unauthorized ways, so what is needed is a way to identify, limit and enforce uses of all accesses independently to allow proper uses to continue and limit unauthorized uses or simply uses that go against administrator set network policies. The limitations to use also need to be structured in ways the network administrators and authoritative personnel can structure, organize, communicate, administer and enforce the access and use of the network. Network policy or a policy driven network is one organizational approach to abstract the control of the network to users, roles and network services. Policy based networking has, however, not been able to provide limits to use based on the applications being used in the network since the method, placement, compute power and granularity of use has not been built into the network fabric before now. The identification of who, where and what applications are running in the network system can then lead to control and allocation of network resources to support the needs as allowed and administered.

Events and activities do occur that may be harmful to the network system. For purposes of this description, harm to the network system includes, for example, denying access to the network, denying access to the service, once access to the network is allowed, intentionally tying up network computing resources, intentionally forcing bandwidth availability reduction, and restricting, denying or modifying network-related information. Intrusion Detection Systems are used to monitor the traffic associated with network sessions in an effort to detect harmful activity. However, IDS functions normally only monitor traffic and analyze the traffic flow for harm, they do not analyze other information nor do they generate or enforce policies. They are designed to observe the packets, the state of the packets, and patterns of usage of the packets entering or within the network infrastructure for harmful behavior. There is some limited capability to respond automatically to a detected intrusion including through intrusion prevention systems. However, these detection systems are configured to search for specific patterns of signals that represent harmful activity. The benefit of the IDS is dependent on the effectiveness of the library of signatures used to detect harmful transmissions.

IDSs frequently implement a signature language that includes functionality allowing a security analyst to describe harmful activity on the network. Such signature languages are fairly complex in order to deal with application layer encodings, handle evasion techniques leveraged by attackers, reduce false positives and generally provide a reliable way to describe the characteristics of current network harm efforts. Applications that may be harmful to the network or at least that can slow down network processes that are not of sufficient importance to the enterprise can be difficult to reliably characterize or "fingerprint" due to efforts to evade such characterizations. Encrypted Bittorrent and Skype are examples of such applications that are difficult to fingerprint. It would be desirable to have a network function that can fingerprint applications in an effective manner. To the extent any IDS has some form of application detection functionality, it is limited to evaluating for malicious activity. The network administrator, in order to be more effective in protecting network services and maximizing network efficiency, would prefer to have characterization of as many applications used on the network as possible, regardless of whether any of the applications are malicious.

From the security and usage efficiency perspectives, the network systems industry has had some difficulty keeping pace with the explosion in the number and types of applications used on networks. This revolution is being powered by new models for application availability embodied by Bring Your Own Device (BYOD) and Cloud Computing environments. The networking model that has been in existence along with the infrastructure that maintains availability and applies policy has not kept pace with the rapid increase in applications. It is desirable to have a network infrastructure architecture that is configured to keep pace with the expansion of application usage on the network.

For purposes of describing the present invention, an "application", which may also be referred to herein as a "computer application" to be characterized (including, for example, by fingerprinting and such other mechanisms as described herein) is any computer code that communicates over the network interface or uses communication-enabling devices of the network as part of it operation. An application is a computer program designed to perform an action. The application can run on any type of computing device including, but not limited to, a server of a network, a desktop computer, a laptop, a tablet, PDA or a smart phone. An application, for purposes of the present invention, includes system computer programs that run computing devices, utility computer programs that perform maintenance and upkeep of computing devices and networks of computing devices, programming tools used to create computer programs, as well as high-level functional computer programs that perform tasks and carry out activities initiated by end users on computing devices. As noted, operating systems are also considered to be applications with respect to the present invention as they may be characterized based on inferences made using operating system specifics from their communications. In addition, network infrastructure device themselves use the network for routing protocols and other traffic such as network management which we will also consider to be applications or uses of the network as demonstrated by adding traffic to the network system. Further, "application fingerprinting" or "application identification" is the act of collecting network traffic and parsing it according to a packet or flow signature set or by statistics, heuristics, history, installed applications base, or other mechanisms, including custom mechanisms. It may include the use of classification techniques used in layer 2 and layer 3 switches and routers. This characterization application identification represents all applications and uses communicated on the network system directly or indirectly. The term "applications running on the network" or variants of that term are used herein to describe those applications that are used, accessed or otherwise engaged through one or more devices of the network infrastructure.

The Open System Interconnection (OSI) model defines a networking framework to implement protocols in seven layers. Control is passed from one layer to the next, starting at the application layer in one station, and proceeding to the bottom layer, over the channel to the next station and back up the hierarchy. The seven layers in reverse order are: Application (layer 7), Presentation (layer 6), Session (layer 5), Transport (layer 4), Network (layer 3), Data Link (layer 2) and Physical (layer 1). The present invention is directed to management of signal exchanges through these OSI layers and they may be referred to herein from time to time.

The Application layer supports computer program applications and end-user processes. Communication partners are identified, quality of service is identified, user authentication and privacy are considered, and any constraints on data syntax are identified. Everything at this layer is application-specific. This layer provides application services for file transfers, e-mail and other network software services. Telnet and FTP are applications that exist entirely in the application level. Tiered application architectures are part of this layer. The Presentation layer provides independence from differences in data representation (e.g., encryption) by translating from application to network format, and vice versa. The presentation layer works to transform data into the form that the application layer can accept. This layer formats and encrypts data to be sent across a network, providing freedom from compatibility problems. The Session layer establishes, manages and terminates connections between applications. The session layer sets up, coordinates, and terminates conversations, exchanges, and dialogues or "flows" between the applications at each end of an exchange between attached functions, between attached functions and network infrastructure devices and between network infrastructure devices. It deals with session and connection coordination. The Transport layer provides transparent transfer of data between end systems and is responsible for end-to-end error recovery and flow control. The Network layer provides switching and routing functionalities, creating logical paths, sometimes referred to as virtual circuits, for transmitting data from node to node. Routing and forwarding are functions of this layer, as well as addressing, internetworking, error handling, congestion control and packet sequencing.

The Data Link layer encodes and decodes data packets into bits. It furnishes transmission protocol knowledge and management and handles errors in the physical layer, flow control and frame synchronization. The Data Link layer is divided into two sub layers: The Media Access Control (MAC) layer and the Logical Link Control (LLC) layer. The MAC sub layer controls how a computer on the network gains access to the data link and controls permission to transmit on it. The LLC layer controls frame synchronization, flow control and error checking. The Physical layer conveys the bit stream—electrical impulse, light or radio signal—through the network links (wires, fiber, RF) at the electrical and mechanical level. It provides the hardware means of sending and receiving data on a carrier, including semiconductor components, wires, cables, cards and other physical structures.

SUMMARY OF THE INVENTION

The present invention includes an application identification function, a dynamic traffic mirroring function, a policy based dynamic mirroring function and a network system controller, all directed to improving network manageability, security and efficiency of operation. The application identification function carried out through an application identification engine, enables the determination or identification of the applications running in the network system through devices of the network infrastructure by snooping the flows of network traffic and making a characterization of the likely application associated with flows with a minimal amount of data in observed frames of received packets to do so. Signature languages have been leveraged in application fingerprinting products, but these languages were not in the past developed specifically for the purpose of application fingerprinting. The present invention takes advantage of intrusion detection languages for the purpose of fingerprinting applications with significant extensions to improve the application identification capabilities.

The application identification function of the present invention includes several mechanisms, but is not limited to those described herein, in order to identify computer applications running on the network through examination of characteristics of information associated with frames of packets received on one or more devices of the network. A first mechanism is the signature-based parsing of network traffic with a signature language that is ideally adapted to describe what application communications look like based on the packets transmitted by the application. A second mechanism is a heuristics-based processing approach to infer the existence of certain applications that cannot reliably be fingerprinted with signature-based means. Other identification options include, but are not limited to, port values, protocol values, statistics analysis, customized programs dependent on characteristics unique to a program and OSI layer 2 information. Further active and passive actions may be employed as mechanisms for application identification including, for example, the probing of attached network and external devices for installed applications, e.g., by sending requests for information associated with applications running on the network. The very presence of certain devices on the network may also be used to ascertain the presence of certain applications as those devices communicate on the network.

In making an application identification, just as network intrusion detection systems develop strategies for the reduction of false positives when trying to detect malicious network usage, proper application fingerprinting must also leverage similar strategies. Reliable application fingerprinting is best accomplished through this combination of both signature and heuristic processing, but there is an inherent conflict between the two techniques when both are applied simultaneously. That is, if a signature says that certain network traffic is application X but a heuristic method says that the same traffic is application Y, which should be most trusted? Through the construction of a scoring system of the present invention with all available mechanisms including those described herein receiving a reliability score, this problem is resolved and leverage all techniques to the best advantage. The scoring system may be derived from a network training period for any specific application fingerprinting deployment, and through the information gained in the training period, a set of scores is assigned to all signatures and heuristic methods. After the training period is over, then the most reliable application fingerprints are those that attain the highest matching score. That determination is established in the application identification function and transmitted to one or more other devices of the network, including a network control manager.

The present invention further includes a mechanism by which application fingerprinting may be enhanced by the experiences of others. That is, the training arrangement described above is effective when sufficient packet transmission occurs in the network to enable the application characterization. However, the network may not see all applications or enough data for all applications to effect sufficient training. The present invention includes the addition of at least pluggable binary modules so that any user can develop custom fingerprinting techniques according to a packet inspection Application Programming Interface (API). This allows the users of the present invention to augment supplied application fingerprinting functionality with new or custom techniques for fingerprinting applications in ways not included in the supplied version. This enhancement of available fingerprints is analogous to an open signature language that became an essential component of major intrusion detection systems in the security world and is desirable because some applications are highly specialized and require dedicated algorithms for reliable detection. By providing an open API for third parties to create characterization programs against, the present invention provides users with a unique infrastructure to acquire packet data that can be processed by the application identification function. An example usage of this option is the implementation of the Luhn Algorithm for the detection of credit card data as it traverses a network.

An aspect of the present invention is the forwarding of one or more frames contained in packets or one or more portions of frames in packets of a flow or at the initiation of a session to the application identification engine of one or more devices of the network infrastructure for the purpose of determining the application associated with the flow/session being established. That is, the mirroring of the one or more packets or portions of packets to a destination other than the original intended destination. The present invention includes a dynamic network traffic mirror function that may be used to mirror traffic through a dedicated port or a selectable portal of a packet forwarding device. The mirroring may be done selectively rather than simply on a regular basis, which would be inefficient. The ability to dynamically launch/create a traffic (flow) mirror to an IDS and/or to the application identification engine improves the capability to monitor the flows of the network anywhere while only needing a very limited set of monitors, IDS sensors or APP ID devices. Frames of flows of traffic from any packet forwarding device can be mirrored without disturbing the normal routing of the messages and maximizing the usage of network bandwidth and the usage of other devices of the network, including IDSs. The dynamic network traffic mirror function can be included or dynamically added to a packet forwarding device of the network system.

Packet forwarding devices of the network infrastructure transmit and receive packets through their ports. A "port" includes a physical component that is a structure to establish a connection between network system devices, including packet forwarding devices, servers and attached functions. However, as is known by those skilled in the art and as used herein, a port is also an application-specific or process-specific software or software and hardware construct serving as a communications endpoint in a network system, the endpoint may be a device of the network infrastructure or an attached function. A port is associated with an IP address of the host, as well as the type of protocol used for communication. A port is identified for each address and protocol by a 16-bit number, commonly known as the port number. The port number, added to a network device's address (such as the device's IP address), completes the destination address for a communication session. It is the combination of an IP address and a port number together that must be globally unique for all communication sessions in a network system. Different IP addresses or protocols may use the same port number for communication.

As seen above a "port" may have several meanings and this may lead to confusion in its use. Further, there is another concept regarding the mirroring of data from a mirror source to a mirror destination. In a simple configuration, the data packets are simply copied to another physical port on the packet forwarding device. In the classic sense a "port mirror" is the copying of all the data received (and/or transmitted) being copied to another port on the same switching device. The traffic mirrors defined herein are more comprehensive than merely copying the traffic to another physical port. The mirrors may use a Generic Routing Encapsulation (GRE) or a Virtual Private Network (VPN) as a transport level tunnel to another device anywhere on the enterprise network or, in fact, anywhere across the Internet. A MAC level or VLAN encapsulation may also be used as a transport mechanism, such as the VLAN connection path encapsulation described in U.S. Pat. No. 6,449,279 incorporated herein by reference, to another device such as the IDS or APP ID engine. To help make clear the operation of the mirrors used herein, the term "portal" is used to identify the connection the mirror source uses. The portal may be as simple as another port on the same device or the traffic may go back out the same physical port on the device encapsulated or tagged in some way. Tunnels, virtual ports, internal interfaces, VPNs, other protocols, and other transport mechanisms including dedicated lines of any physical layer type may all be set up, used and defined as part of the mirror portal. The term portal therefore refers to that logical link to the mirrored traffic's destination. The portal acts as a connection including as a tunneled connection, and is responsible for delivering the traffic to the other end (the destination end) subject to the limitations of the portal itself. Some portals guarantee transport delivery, while others are best effort delivery, still other portals may have encapsulation limitations. Mirror set-up along with destination selection, location, service and performance or dynamic mirroring policies may determine the portal or portal type to use for a specific mirror.

The dynamic traffic mirroring function of the present invention is not limited to only facilitating the identification of computer applications running on the network. It provides the capability to select options based on a plurality of criteria to mirror any portion or all of the frames of packets received on the network. The dynamic traffic mirroring function can do at least one or more of: 1) mirror all or any portion of the flow, such as the first N packets, the first M fields, the first L Bytes, selected fields and one-way or bidirectional flows; 2) define flows by source address-destination address, Tuple, 5-tuple, application, etc.; and 3) transport the packets by portals to generalized or specific destinations. It can be controlled by an IDS and/or by a dynamic mirror controller, the network control manager or other network infrastructure devices. The function may be located in a network device selected to carry out selectable mirroring functions based on one or more of mirroring device load, bandwidth, security (or encryption could be added), ability to maintain flow pathways to a designated location, require encryption for transmission beyond the designated location, locality (of source, receiver or another device of the network), direction or flows (e.g., mirror the source of a flow at one point and the traffic returned from the destination at another point in the network). This set-up flexibility allows for more bandwidth-efficient mirroring, it can be used to take mirror traffic out of the high "cost" paths of the network, it can be used to control mirror traffic to be set at low priority when in "search" mode and then set to a higher priority when in "isolate a problem" mode. Moreover, with the dynamic mirroring function, traffic can be controlled by more than one IDS, application identification engine, monitor, logger, etc. to more than one destination and/or to multiple monitoring devices that can be specialized or dedicated to certain tasks without physical network topology location dependence. In effect, this function provides automated dynamic intelligent filtered flow mirroring to multiple portals.

Mirroring has typically been a manually set up "port mirror" to another port on the switch. The dynamic traffic mirror of the present invention extends the ability to "flow mirror" the first N-packets or other varying sets of frames in a new flow and other selections of existing flows or data within the flow. This function brings data flows from anywhere in the network to the IDS or any other selectable network infrastructure device or function. IDS devices no longer need to be located on the segment they monitor in the network, although they could be, with other flows not normally passing that point being "mirrored" to the device. This makes the IDSs, as well as other types of monitoring devices, of the network more efficient. Mirrors can be controlled to only "mirror" relevant traffic and the mirroring controller can define/change the mirrors based on detected events, time-of-day, IDS load, etc. It is noted that many IDS signature matches happen early within application layer communications, so the dynamic mirror function with respect to application identification at least is an IDS enabler while at the same time allowing for greater efficiency of flow setup and activity. More broadly, the dynamic mirror function can be used to filter traffic flows and that filtering can be changed automatically on-the-fly. Less investment in monitoring equipment, such as Application Identification or IDS equipment required by customers, is accomplished cheaper and better than has heretofore been possible with more flows monitored and less monitor processing bandwidth being used to handle packets for which examination of the content of frames of those packets does not don't contribute to enhanced intrusion detection. The dynamic mirroring function enables transmission to multiple devices of the network by establishing multiple portals to do so. As a result, it is not limited to a specific transmission port and mirroring to more than a single device (dynamically) can occur at one time. Existing port mirrors tend to mirror the traffic to only one other device on a single port.

The set-up, teardown and filtering employed in the mirroring activity can be adjusted based on network policies, the detection of particular triggers by the device performing the mirroring or another network infrastructure device. This aspect of the present invention may be set up and controlled by the dynamic mirroring policy. Examples for criteria which may generate a mirroring activity include, but are not limited to, frames of packets, the content of particular fields in a frame, flow counts, the end of a flow, a regularly timed mirroring initiation or any other conditions of interest to the network administrator can be used as conditions for establishing mirroring activities on a device of the network. In addition, events or criteria may be established for stopping the mirroring function. For example, a mirroring activity may be stopped based on the data value in a packet field, a network, regional or device specific event, a simple count of packets or other flow metric, a time out, the end of flow or based on a change in a prioritization condition (i.e., a condition has occurred wherein mirroring must be performed on a different flow that has been designated as being of higher priority for mirroring, particularly when the device carrying out the mirroring has limited capacity in that regard.

As noted, the dynamic traffic mirroring function is not limited to IDS operations or even application-specific network analysis and control. For example, it may be used more generally in network access control. Dynamic traffic mirroring points are established through dynamic mirroring policies of a dynamic traffic policy function. The mirroring policies that may be dynamically established are dependent on a wide range of triggering conditions. Examples of such mirroring policies include, but are not limited to: 1) mirror the first N packets of any new application flow from a source to the nearest IDS; 2) mirror all flows from a newly authenticated user for a specified time to an available application engine; 3) determine the IDS to use based on load/location/priority; 4) randomly mirror flows (spot checks) as bandwidth and IDS loads allow; and 5) mirror all new flows to/from the internet router/gateway/firewall for N packets. Current mirroring policies, to the extent they exist in a network system, are either ad hoc or simply manually controlled by administrators. These may be limited to the locality of IDS devices and network topology. Flows of traffic from any packet forwarding device may be mirrored based on policy rules based on: 1) network loads at various points; 2) time of the day; 3) link outages and other topology bandwidth constraints; 4) server location and status; 5) user numbers; and 6) wireless access point use and number. Further, the dynamic mirroring function may be used based on policies based on the conditions noted herein regarding dynamic mirroring for application identification.

This general policy-based mirroring allows network administrators to set network mirror policies for various network monitors including, for example, application identification appliances, IDSs, network loggers, analyzers, etc. These policies may be set based on device, user, topology, time-of-day, network events (e.g., triggers) mirrored to device availability, location and load. Given the breath of dynamic mirroring capabilities, the capabilities exceed administrator manual set-up capabilities. Rapid dynamic mirrors can better optimize monitor and IDS devices and possibly other network devices and remove their physical location as a primary factor in their physical placement in the network topology. This provides the added structure of policy rules for dynamic network traffic mirroring so that policies may be based on user roles and or device services, for example. As noted, it provides the capability to improve coverage and IDS utilizations and it improves the ability to "monitor" the right flows (filtered) flows at the right times. The present invention thus provides an automatic way to deal with network events. For purposes of the present invention, automatic actions mean those actions that are carried out by a device of the network system based on a condition or event detected by a device of the network system that causes the initiation, through one or more devices of the network system, of changes in one or more of one or more policies, one or more rules, and one or more actions without requiring human intervention to initiate the one or more changes when the condition or event has been detected.

In the context of application-based dynamic network policy, the present invention includes the usage of such information to apply a policy to an application level flow, or set of flows or to modify local or network-wide policies. The application identification function described herein can be used to extract metadata such as HTTP request referrers, SSL common names, usernames in various protocols, Kerberos key information and more as a mechanism to change network policy and use rules on the fly. Thresholds, pattern matches, and other modifiers can be leveraged to have the network enforce policy rules against flows based on these metadata specifics. The application signatures fingerprinting mechanism for application identification can be enhanced to include the ability to log application information including, for example, layer metadata, and further can be used for modification of network policy. The other mechanisms described herein for application identification may also be used to characterize information associated with applications running on the network and that information may be used in establishing policies. Beyond changing policy based on a macro-level application fingerprint, the usage of metadata allows network policy to be applied based on much more fine grained application descriptors. In one version of this functionality, the policy enforcement mechanism can parse and leverage application identification information produced by the application fingerprinting function. In another version, metadata may be transmitted to a network policy engine for the purpose of distributing policy enforcement to appropriate points (including close to or at the point of entry) in the network. This enables a finer granularity of enforcement and control of flows than has been previously provided, if that is of interest.

Embodiments of policy enforcement options that may be established with greater effectiveness include, but are not limited to: 1) disable a port; 2) disable MAC address; 3) disable a user; 4) quarantine a user; 5) block a specific application flow; 6) block an IP address; 7) snipe a TCP connection; 8) disable communication for an application; 9) disable communications to an attached function; 10) disable a network communication, in either or both of a forward path and a reverse path; 11) bandwidth-limit an application by a particular user; 12) bandwidth-limit an application for all users of the network system; 13) log all application data; and 14) honeypot the application flow. While the first four examples are widely in use, the others require the identification of the application flow within the user/devices total data flow. This ability to characterize applications effectively may be used to establish new policies based on those applications and the new metadata associated with those applications, which such new policies may not be possible but for that information. One view of how this functionality may be useful in a network security and efficiency control environment is noted as follows. While all employees may be given Internet access, limits may be placed on time-of-day access, bandwidth, or complete use of an application. Bandwidth or data limits can be placed on uTube. Gambling application may be prohibited. This finer granularity of knowledge based on applications may be characterized in this context as applying policy based on application layer metadata that is transmitted on the wire. For example, the network administrator may block particular SSL connections based on a particular SSL certificate common name, or block Kerberos communications that rely on a particular key. Policy enforcement may be targeted at the application level allowing administrators to target policies best suited for their business needs.

The ability to identify applications running on any device of, or connected to, the network infrastructure, as well as the ability to dynamically mirror traffic enables the establishment of a novel network architecture that may be configured to be applications-centric. The application identification capability provided by the functions described herein allows the application to be identified, tied to devices and users, located in the network and controlled via organized network policies. With proliferation of mobile devices, especially smartphones and tablets, and the countless applications (apps) available for them, there is a strong need for this added level of control. Components of the network architecture include: 1) the dynamic mirroring capability described herein that is part of the network system established or that can be established, in one or more packet forwarding devices of the network, including one or more network entry devices; 2) the application identification function, which may be carried out in a standalone device or another device of the network infrastructure, including a device having packet forwarding as a primary function; and 3) 4) network and policy management functions including a monitoring function, that can take in monitored information, including information from the application identification function, network status and event and administrative policy input, and can issue policy directives, either directly or through another network infrastructure device. This final step is also referred to as a Policy Decision Point (PDP) extended to embrace application level control. The enhanced ability of Policy Enforcement Points (PEPs) of the network combined with typical network deployment paradigms (gateway, access edge, core/distribution, and data center) in order to maximize the ability to identify applications running through the network and the ability to apply network policy controls to them based on that information and decision making enhances network operational efficiency while also maintaining or enhancing network security. The architecture can also include aggregation and reporting functions that collect and analyze application identification and other monitored information. That information may be used to enforce, add and establish network policies as well as mirroring policies.

The dynamic mirroring function enables a targeted approach to frame mirroring in order to maximize application identification effectiveness while simultaneously minimizing data that must be mirrored to an identification appliance or to any network infrastructure device configured to carry out the application identification function. This allows the whole solution to scale to extremely large and fast networks. The application identification function, which, as noted, may be a standalone device or embodied in another network infrastructure device, collects and analyzes the transferred frames of packet data flows that are provided by dynamic mirroring and also integrate other information, such as Netflow information and the other application identification mechanisms noted herein. The network policy function evaluates the information gathered and can apply network policy controls (enforcements) on a per-flow basis at, or close to flow ingress.

The details of one or more examples related to the invention are set forth in the accompanying drawings and the description below. Other features, objects, and advantages of the invention will be apparent from the description and drawings, and from any appended claims.

BRIEF DESCRIPTION OF THE DRAWINGS

FIGS. 4A-4C list scoring results for the identification of a set of applications generated by the scoring machine of the present invention.

DETAILED DESCRIPTION OF PREFERRED EMBODIMENTS OF THE INVENTION

Figure 1:
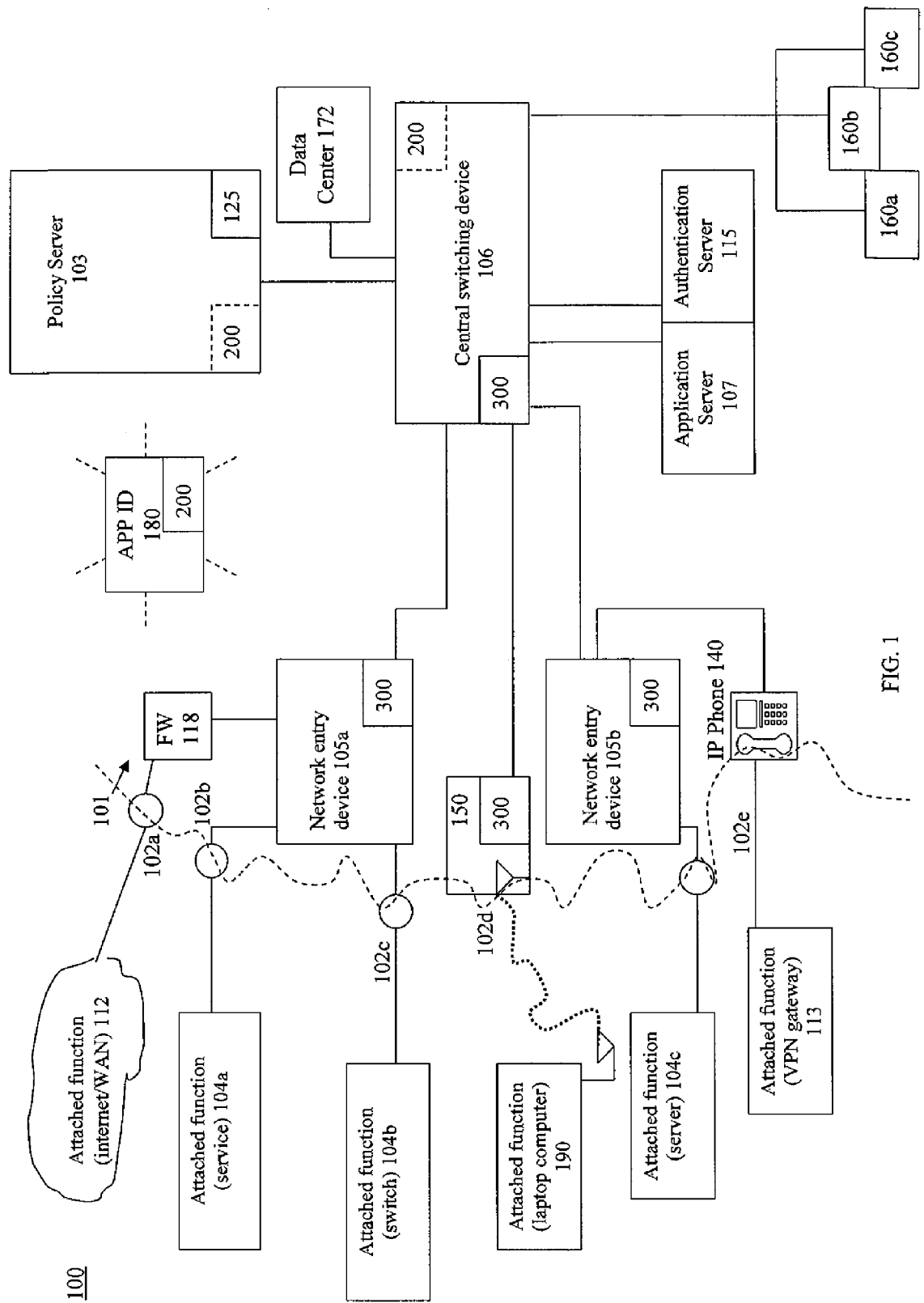
FIG. 1 is a simplified diagrammatic block representation of an example network system with the functions of the present invention.

The devices and systems of the present invention are individual and connected hardware components including electrical elements, circuitry and functions embodied in those components. The hardware components are generally referred to as computing devices in that they combine physical hardware structures with software that may include firmware and middle ware for the purpose of executing instructions that produce the actions described herein. It is to be understood that the hardware devices that are network infrastructure devices defined herein represent computing devices suitable for executing the network functions described herein. Other types of computing devices may also be part of a network system of the present invention including such computing devices that perform network functions. Such other types of computing devices include laptops, tablets and mobile devices including smartphones, for example. It is to be understood that a computing device described herein may be any type of device having a processor capable of carrying instructions associated with one or more computer applications. The illustrations of the network system devices presented in the drawings are simplified representations and are in no way intended to be limiting as to the appearance of these devices. Further, while the devices may be shown in proximity to one another, it is to be understood that they may be local or remote with respect to one another and that there may be some devices that are located near one another while others and groups of others may be remotely located.

Each of the devices described herein may include one or more discrete processor devices. One or more of the network infrastructure devices described herein are programmed to include one or more of the functions described. The devices may contain or be connected to one or more databases of other devices wherein the one or more databases include information related to the invention. For example, the database may include a library of application fingerprints, one or more policies to be implemented on one or more of the devices and information about actions performed by the one or more devices. The one or more databases may be populated and updated with information by authorized users and attached functions.

The functions of the invention described herein with respect to the operations of the devices may be described in the general context of computer-executable instructions, such as program modules, being executed by a computing device. Generally, program modules include routines, programs, objects, components, data structures, etc. that perform particular tasks or implement particular abstract data types. As noted, the present invention can be practiced in distributed computing environments where tasks are performed by remote processing devices that are linked through one or more data transmission media. In a distributed computing environment, program function modules and other data may be located in both local and remote device storage media including memory storage devices.

The processor, interactive drives, memory storage devices, databases and peripherals, such as signal exchange components, of a particular device may be interconnected through one or more electrical buses. The one or more buses may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Each of the devices of the present invention includes one or more of one or more different computer readable media. Computer readable media can be any available media that can be accessed by the processor and includes both volatile and non-volatile media, removable and non-removable media. By way of example, and not limitation, computer readable media may be computer storage media and/or communication media. Computer storage media include volatile and non-volatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer system.

Each of the devices further includes computer storage media in the form of volatile and/or non-volatile memory such as Read Only Memory (ROM) and Random Access Memory (RAM). RAM typically contains data and/or program modules that are accessible to and/or operated on by the processor. That is, RAM may include application programs, such as the functions of the present invention, and information in the form of data. The devices may also include other removable/non-removable, volatile/non-volatile computer storage and access media. For example, a device may include a hard disk drive or solid state drive to read from and/or write to non-removable, non-volatile magnetic media, a magnetic disk drive to read to and/or write from a removable, non-volatile magnetic disk, and an optical disk drive to read to and/or write from a removable, non-volatile optical disk, such as a CD-ROM or other optical media. Other removable/non-removable, volatile/non-volatile computer storage media that can be used in the devices to perform the functional steps associated with the system and method of the present invention include, but are not limited to, magnetic tape cassettes, flash memory cards, digital versatile disks, digital video tape, solid state RAM, solid state ROM, and the like.

The drives and their associated computer storage media described above provide storage of computer readable instructions, data structures, program modules and other data for the processor. A user may enter commands and information into the processor through input devices such as keyboards and pointing devices, such as a mouse, a trackball, a touch pad or a touch screen. Other input devices may include a microphone, joystick, game pad, satellite dish, scanner, or the like. These and other input devices are connected to the processor through the system bus, or other bus structures, such as a parallel port or a universal serial bus (USB), but is not limited thereto. A monitor or other type of display device is also connected to the processor through the system bus or other bus arrangement.

The processor is configured and arranged to perform the functions and steps described herein embodied in computer instructions stored and accessed in any one or more of the manners described. The functions and steps, may be implemented, individually or in combination, as a computer program product tangibly as computer-readable signals on a computer-readable medium, such as any one or more of the computer-readable media described. Such computer program product may include computer-readable signals tangibly embodied on the computer-readable medium, where such signals define instructions, for example, as part of one or more programs that, as a result of being executed by the processor, instruct the processor to perform one or more of the functions or acts described herein, and/or various examples, variations and combinations thereof. Such instructions may be written in any of a plurality of programming languages, for example, Java, Visual Basic, C, or C++, XML, HTML and the like, or any of a variety of combinations thereof. Furthermore all such programming may be integrated to eventual delivery of information and computed results via web pages delivered over the internet, intranets, 3G, 4G or evolving networks to computing devices including those in the mobile environment, for example, Smartphones or iPhone, iPad and the like or any variety of combinations thereof.

All the data aggregated and stored in the database or databases may be managed under an RDBMS for example Oracle, MySQL, Access, PostgreSQL and the like or any of a variety of combinations thereof. The RDBMS may interface with any web based or program driven applications written in any compatible programming languages including PHP, HTML, XML, Java, AJAX and the like or any of a variety of combinations thereof. The computer-readable medium on which such instructions are stored may reside on one or more of the components described above and may be distributed across one or more such components.

The present invention includes individual devices and combinations of such devices and other devices as well as related methods to improve the security and operation of a network system. Referring to FIG. 1, a network system 100 incorporating the functions of the present invention operates and provides network services to attached functions according to policies established on and transmitted to devices of a network infrastructure 101 through which the attached functions access and use services of the network system 100. Network system 100 includes the network infrastructure 101 and one or more attached functions connected to or connectable to the network infrastructure 101. The network infrastructure 101 includes multiple switching devices, regional and central routing devices, authentication servers (such as authentication server 115), policy servers (such as policy server 103, which may also include a network management control function 125), network control management devices (separate from or including the network management function 125, applications servers (such as application server 107), data centers containing information associated with network operations (such as data center 172), firewalls (such as firewall 118), IDSs, access points, MANs, WANs, VPNs, and internet connectivity interconnected to one another and connectable to the attached functions by way of connection points (e.g., 102a-e). The network infrastructure 101 includes such devices having packet forwarding functionality as their primary functionality for the purpose of accessing and using network services. The network management control function 125 is shown as a single function in FIG. 1; however, it is to be understood that it represents network policy control, dynamic mirror control, dynamic mirror policy control and all other control functions described herein. It may be embodied in a single device of the network infrastructure 101 or it may be embodied in multiple devices, wherein different devices may contain one or more of the specific controllers described herein.

An attached function is external to infrastructure 101 and forms part of network system 100. Examples of attached functions 104a-104e are represented in FIG. 1, and may be any of the types of attached functions previously identified. Network infrastructure packet forwarding entry devices 105a-b, 140 and 150 of infrastructure 101 provide the means by which the external attached functions connect or attach to the infrastructure 101. The firewall 118 may be deployed between any attached function, particularly including an internet function, and a network entry device. Although shown as a single firewall in FIG. 1, other firewalls may be deployed. A network entry device can include and/or be associated with a wireless access point (AP) 150. For wireless connection of an attached function to the infrastructure 101, the wireless access point 150 can be an individual device external or internal to the network entry device 105b. Wireless APs may or may not be associated with a wireless controller (not shown) and these devices may alter the logical arrangement of access for attached functions but do not substantially change the network topologies. In at least one way, appearing as the logical entry point for all wireless AP traffic, the wireless controllers may help aggregate AP traffic to a more consolidated point for monitoring and other activities, including mirroring.

One or more devices of the network infrastructure 101, including one or more standalone appliances, if desired, include an application identification function 200 of the present invention. The application identification function 200 is configured to characterize and identify the application associated with a flow. Further, one or more devices of the network infrastructure 101 include a dynamic traffic mirroring function 300. The dynamic traffic mirroring function 300 is configured to selectively mirror traffic of a flow to another device of the network infrastructure 101 including, but not limited to, a device including the application identification function 200. For the purpose of illustrating the present invention, some of the devices include the application identification function 200 and some include the dynamic traffic mirroring function 300. Some may include both and some may include neither. One or more centralized network infrastructure devices may include either or both of the functions 200 and 300. Further, there may be a combination of network entry and centralized forwarding devices having the application identification function 200 and/or the mirroring function 300 of the present invention. It is also to be noted that one or more external attached functions may include one or both of functions 200 and 300 provided that such external attached function is under effective control of the network management control function 125. Moreover, as noted, the application identification function 200 may be in a standalone application identification appliance 180 of the network infrastructure 101, which appliance 180 may include the mirroring function 300. The appliance 180 shown in FIG. 1 includes a plurality of dashed lines that represent the option to connect to one or more devices of the network infrastructure 101 including, but not limited to, the entry devices 105a-105c and the central switching device 106.

One or more central forwarding devices, represented by central switching device 106, enable the interconnection of a plurality of network entry devices, such as devices 105a-b, as well as access to network services, such as the central policy server 103, the application server 107 and the authentication server 115. It is to be understood that a central forwarding device, or an entry forwarding device, is not limited only to switches as that term is traditionally understood. Instead, the forwarding device may be any device capable of forwarding signals through the network infrastructure pursuant to forwarding protocols. The central switching device 106 enables the interconnection of the network infrastructure 101 to attached external functions that include VPNs (represented by VPN gateway device 113) and WANs (represented by internet cloud 130) as well as Internet Protocol (IP) telephones (represented by telephone 112), as well as to attached internal functions, such as printers, computing devices and the like represented as attached network functions 160a-160c. It is to be understood that the IP telephone 140 may also perform as a network entry device for the purpose of connecting an attached function, such as a laptop computer, to the network infrastructure 101.

In packet forwarding devices such as the routers and switches of the network, packets are received and forwarded as a normal part of the working of these devices. Packets may be forwarded according to the OSI Data Link layer (layer 2) specifications such as the IEEE 802.1D and subsequent IEEE 802.1Q standards. Other switching or routing devices may perform packet forwarding according to other known routing standards, such as IETF IPv4 and IPv6. These devices may support different electrical, RF and optical interfaces, and have different numbers of each interface, and also operate these interfaces at different speeds. These devices are suitable for configuration to carry out one or more of the functions described herein, including the dynamic traffic mirror function and the application identification function. As a matter of course in the classification of the packets for the packet forwarding capability, the switching device may know the exact classification of the packet. For purposes of providing application identification functionality, this capability can be built into the switching device to report the classified traffic to a central or distributed form of the application engine forming part of a packet forwarding device or devices and/or other devices of the network infrastructure 101 complete with scoring information regarding the application identification classification. This capability is available and available particularly with respect to layer 2 protocols. Packets that are layer 2 classified by the packet forwarding device may or may not be forwarded to the application identification engine for processing. Different packet forwarding devices of the network infrastructure 101 may or may not support the layer 2 application identification classification and reporting function and thus may be treated differently by the application identification control function.

Signals are exchanged among the devices of the network infrastructure using existing communication protocols. For purposes of gathering information regarding applications using the network services and the status of network devices, the present invention includes the use of the industry standards, NetFlow and Internet Protocol Flow Information Export (IPFIX), for the purpose of transmitting and considering flow information. NetFlow was established by Cisco Systems for the purpose of collecting IP traffic information. NetFlow provides an established designation of seven elements of a packet that define the characteristics of a flow, including ingress interface, source IP address, destination IP address, IP protocol, source port for Uniform Datagram Protocol (UDP) or Transmission Control Protocol (TCP), destination port for UDP or TCP and IP type of service. That information is useful for determining flow characteristics, but it does not contain all values that may be of interest and it does permit customization of flow characterization information to be collected. IPFIX is an IETF protocol that solves some NetFlow limitations. It was created based on the need for a common, universal standard of export for Internet Protocol flow information from switches, routers, probes, and other devices that are used by network management systems to monitor, manage and facilitate network usage and services. The IPFIX RFC defines how IP flow information is to be formatted and transferred from an exporter to a collector. The IPFIX standards requirements were outlined in the original RFC 3917. The basic specifications for IPFIX were published in 2008 as RFCs 5101, 5102 and 5103. In brief under IPFIX, data packet information is collected at a network device and sent to a collector of the network infrastructure. One device can send collected data to many collectors and a collector can collect data from many devices of the network.

IPFIX considers a flow to be any number of packets observed in a specific timeslot and sharing a number of properties, e.g., "same source, same destination, same protocol", essentially a "flow". Using IPFIX, network devices such as switches can inform a central network administrator about the network as a whole and in individual locations.

IPFIX is a push protocol, i.e., each device periodically sends IPFIX messages to configured collectors, such as network management devices without any request by the collectors. The actual makeup of data in IPFIX messages is to a great extent up to the device sending the data. IPFIX introduces the makeup of these messages to the receiver with the help of special Templates. The sender is also free to use user-defined data types in its messages, so the protocol is freely extensible and can adapt to different scenarios. In one preferred embodiment, an application identification engine described herein embodying the application identification function 200 of the present invention uses the encodings and extensions allowed through IPFIX as the protocol to communicate with the various other devices attempting to perform specific portions of the application identification process. IPFIX generally uses the Stream Control Transmission Protocol as its Transport layer protocol, but also allows the use of the TCP and the UDP.

Figure 2:
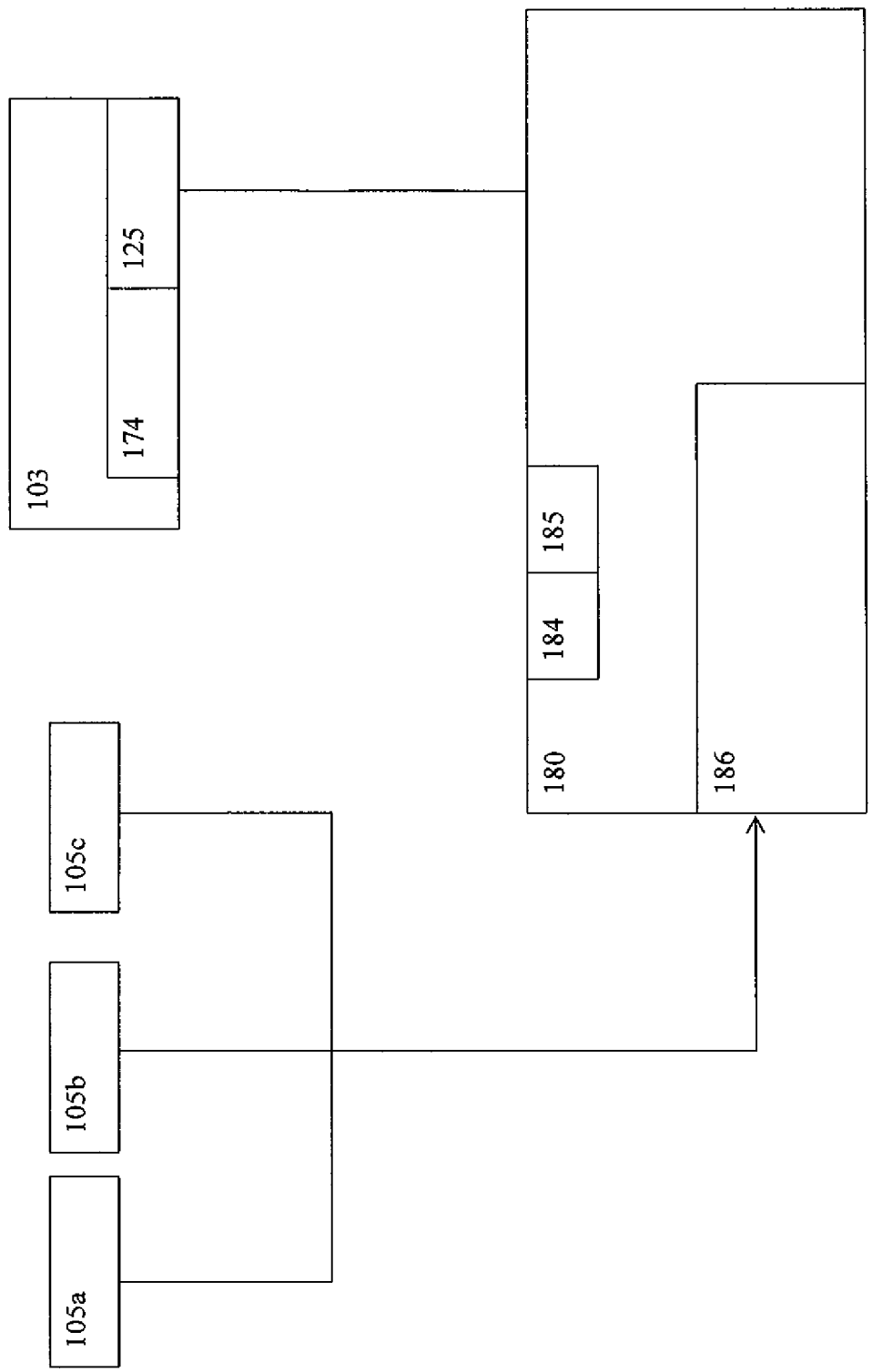
FIG. 2 is a simplified block representation of a combination network infrastructure devices arranged for application identification.

An application identification appliance 180 including the application identification function 200 is represented in FIG. 2 in a simplified way in relation to other devices of the network infrastructure 101 with which it communicates. The appliance 180 exchanges information and command signals with the network system control manager 125, which may be associated with the central policy server 103 and which may be embodied in one or more devices of the network infrastructure 101. An example of the control manager 125 is the NetSight® management system available from Enterasys Networks of Salem, N.H. The control manager 125 may include or at least control a dynamic mirroring engine used to mirror traffic by a network packet forwarding device as described more fully herein. Such a mirroring engine may exist in another device of the network infrastructure 101, including the device that does the mirroring The appliance 180 includes a management engine 184 and an application identification engine 186 that performs the application identification function 200. The appliance 180 receives packets from other devices of the network infrastructure 101, such as network entry devices 105a-c. Those packets are mirrored to the application identification engine 186 on a regular basis or in a selectable way through dynamic traffic mirroring as described herein. The packets transmitted to the application identification engine 186 are assessed through a plurality of mechanisms for characteristics representative of the application associated with the packets transmitted. Further, the assessed characteristics are scored, including the option of weighting the different mechanism equally or differently in the scoring, and a composite is resolved as a specific application assessment. That assessment of the characterization of the packet or flow of packets is transmitted as information to the management engine 184 through IPFIX. The management engine 184 may optionally be configured to make a final determination of the characterization of the application associated with the packet or flow of packets and transmit the final determination to the network system control manager 125. The appliance 180 may be further configured with additional statistical gathering, control inputs and communications connections to the control manager 125 through the management engine 184. The information gathered, examined and used in the application identification as well as the output to the control manager 125 may be logged at the appliance 180 and/or elsewhere. The logged information is used to form a "history" of the applications and other information. The history may further be used as an input into the process of network application identification described herein. More broadly, the information may be stored as a source of determining whether a particular application has already been installed on a device of the network infrastructure 101.

The policy server 103 or another network management device of the network infrastructure 101 may include an application identification configuration engine 174 coupled to the management engine 184 of the appliance 180. The configuration engine 174 exchanges information and instruction messages with the appliance 180 for the purposes of checking the status of the appliance 180, to modify the content of an applications signatures library 185 of the appliance 180, to add custom application identification components and to configure the identification engine 186. Messages are exchanged in any way suitable for device management including through, but not limited to MIBs and SNMP. That form of information and/or instruction exchange can be used for other actions described herein. Outputs of the identification engine 186 associated with the characteristics of mirrored frames of packets associated with one or more flows are forwarded to the management engine 184 by any suitable protocol for the network exchange of information. Frames mirrored from the network devices to the identification engine 186 may also be mirrored directly to the management engine 184 for transmission to the control manager 125 or network logging or to other functions and devices. The mirrored frames may also be mirrored to one or more other devices of the network infrastructure 101.

Figure 3:
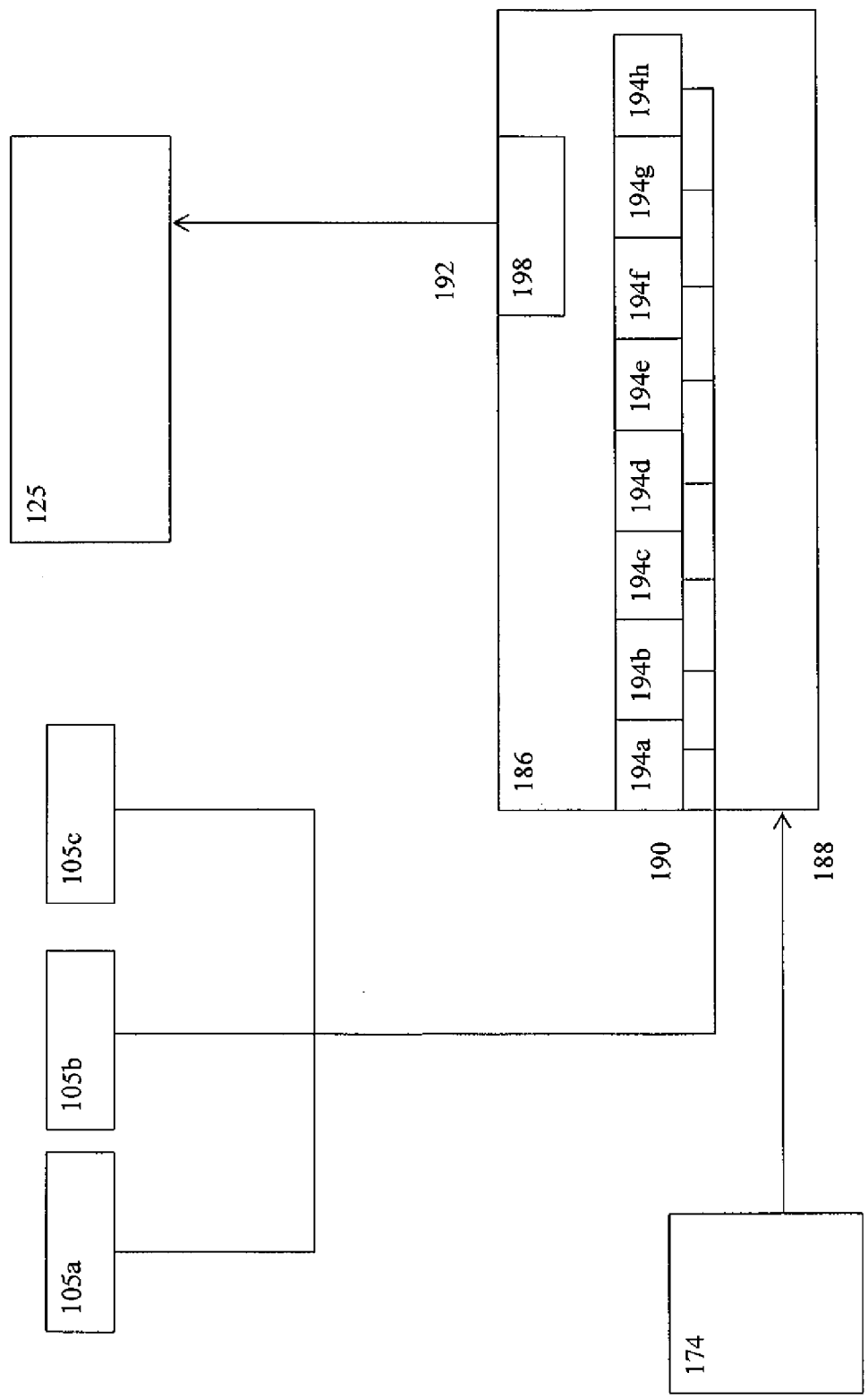
FIG. 3 is a simplified block representation of an application identification engine of the present invention.

The application identification engine 186 is further represented in FIG. 3. The application identification engine 186 includes a mirrored frames interface 188, a network management interface 190, a results output interface 192, a set of different analysis mechanisms or functions 194a-194h and a scoring analysis engine 198. The engine 186 receives information and instructions from the configuration engine 174, conducts scoring analyses based on provided information and guidelines and outputs scoring results through port 192 to the control manager 125 for further analyses, decision making, policy changes and the like. Examples of the plurality of analysis mechanisms used in making a determination about the likely application associated with particular frames examined include, but are not limited to: a) a comparison 194a of one or more signatures (pattern matching) associated with computer applications; b) port values 194b; c) protocol values 194c; d) statistics 194d; e) heuristics 194e; f) history 194f; g) installed applications 194g; and h) custom analysis 194h that are administrator or user dependent. The engine 186 receives instructions and information at the first entry port 188 and mirrored packets at the second entry interface 190. The mirrored frames are further sent or shared with each of the analysis functions 194a-194h for application identification. Effective application identification typically requires the usage of multiple techniques for parsing and analyzing network communications. While shown as a completely parallel and distinct set of operations, the operations may be serialized; they may happen as specialized functions partially or completely in specialized hardware or other devices of the network infrastructure 101, and/or performed at separate times, and/or as separate functions in separate devices. These detection and analysis techniques range from simple port comparisons all the way through complex pattern matching algorithms, regular expressions, and statistics-based determinations including packet and flow information from other functions and devices. The following table describes some available application identification mechanisms used herein and examples of each:

| Detection Technique | Example | Fingerprintable Apps. | Non-fingerprintable Apps. |
|---|---|---|---|
| TCP/UDP canonical port values | UDP/53 == DNS | DNS, HTTP, SSH, SMTP, etc. | Applications on non-standard ports, and apps that dynamically select port values (P2P) |
| IP Protocol value | IP proto 47 == GRE | GRE tunnels, OSPF, IPIP (these aren't apps really - just more interesting than IPv4 or IPv6) | Any application that leverages IPv4 or IPv6 |
| Pattern Matching | HTTP/20, User-Agent: | HTTP, HTTPS, SSH, STMP, Facebook, Yahoo, Twitter, etc. | Encrypted Bittorrent, Skype |
| Regular Expressions | Host\x2a\s(?:www)?youtube\x2ecom | Accounts for complex application layer encodings - Facebook, Yahoo, Twitter, etc. | Encrypted Bittorrent, Skype, anything that requires extreme performance |
| Statistics-based Mechanisms | SPID database values for SSH banners | Encrypted Bittorrent, Skype, SSH, HTTPS, etc. | ? |

The application identification engine 186 implements all of the above techniques including statistics-based fingerprinting so that "problem" protocols such as encrypted Bittorrent and Skype can be identified (fingerprinted).

It is useful to construct groups of application signatures for the purposes of organization and clarity, especially for outputting results in a useful manner to network administrators and to serve as input to policy driven network control. Many applications share a common purpose or usage pattern, and this helps to provide guidance for the generation of application groupings. For example, Facebook and Twitter are both social networking applications even though the underlying technologies and platforms powering both are quite different. Hence, it is useful to place Facebook and Twitter into the "social networks" application group along with other similar applications such as Google's G+ service. The table below outlines a set of application groupings. Others may be employed dependent on network management interests:

| Application Group | Unifying Characteristic | Example Applications |
|---|---|---|
| Social Networking | Emphasis is on in-application user communications and interactions | Facebook, Twitter, G+, LinkedIn |
| VPNs and Security | Encrypted communications | SSH, OpenVPN, IPSEC, Scanners (such as Metasploit) |
| Games | Interactive goal oriented entertainment | Diablo III, Online Poker |
| Business Applications | Enterprise class productivity | SAP, GERS, Agile |
| Databases | Query/result model | Oracle, MySQL, Postgres |
| Peer-to-Peer | File and data transfer | Bittorrent, eDonkey, Kazaa |
| Search Engines | Web-based standard search model (to include indexing crawlers) | Google, Yahoo |
| Software Updates | Local OS/application querying of centralized software update service | Anti-virus updates, Microsoft updates, Linux patches |
| Web Applications | General bucket for web applications that do not warrant inclusion within one of the other groups | Google Maps, Flickr, SSL certificate common names for arbitrary sites |
| Internet Infrastructure | Core Internet protocols | DNS, SMTP |
| Miscellaneous/Custom | Application does not warrant inclusion within one of the existing groups | Custom one-off networked application |

The following table represents a template of HTTP IPFIX for an "appflow-spec-v1" document. This template may be the basis for characterizing an application flow to be used in identifying it wherein metadata are to be collected and generated via IPFIX.

| | |
|---|---|
| Set ID = 2 | Set Length = 152 |
| Template ID = 258 | Field Count = 27 |
| Observation point ID (observationPointId, 138) | Unsigned32, 4 |
| Export process ID (exportingProcessId, 144) | Unsigned32, 4 |
| Flow ID(flowId, 148) | Unsigned64, 8 |
| Transaction ID(transactionId, 32897) | Unsigned32, 4 |
| Enterprise ID | |
| Connection ID(connectionId, 32901) | Unsigned32, 4 |
| Enterprise ID | |
| Ipversion(ipVersion, 60) | Unsigned8, 1 |

| | |
|---|---|
| IP protocol number(protocolIdentifier, 4) | Unsigned8,1 |
| Padding(Padding, 210) | Unsigned8,2 |
| Ipv4 SRC IP(sourceIPv4Address, 8) | Ipv4address, 4 |
| Ipv4 DST IP(destinationIpv4Addres, 12) | Ipv4address, 4 |
| SRC Port(tcpSourcePort, 182) | Unsigned16, 2 |
| DST Port(tcpDestinationPort, 183) | Unsigned16,2 |
| Pkt Count(packetDeltaCount, 2) | Unsigned64, 8 |
| Byte Count(octetDeltaCount, 1) | Unsigned64, 8 |
| Flag(TCP Control Bits, 6) | Unsigned8, 1 |
| Flags(flowFlags, 32900) Enterprise ID | Unsigned64,8 |
| Time for first pkt in microseconds(flowStartMicroseconds, 154) | dateTimeMicroseconds, 8 |
| Time for last pkt in microseconds(flowEndMicroseconds, 155) | dateTimeMicroseconds, 8 |
| ingressInterface(ingressInterface, 10) | Unsigned32,4 |
| egressInterface(egressInterface, 14) | Unsigned32,4 |
| appID(appID, 32919) Enterprise ID | Unsigned32, 4 |
| HTTP Request URL(httpReqUrl, 32898) Enterprise ID | |
| HTTP Request Cookie(httpReqCookie, 32899) Enterprise ID | VariableLength, 65535 |
| HTTP Request Referer(httpReqReferer, 32908) Enterprise ID | VariableLength, 65535 |
| HTTP Request Method(httpReqMethod, 32909) Enterprise ID | VariableLength, 65535 |
| HTTP Request Host(httpReqHost, 32910) Enterprise ID | VariableLength, 65535 |
| HTTP Request User-Agent(httpReqUserAgent, 32911) Enterprise ID | VariableLength, 65535 |

A significant amount of information is included within raw flow records about IP addresses, protocols, and transport layer port numbers. Given that there are over 10,000 assigned applications unique port values (which are 16-bits wide in the TCP and UDP headers), there is always the possibility that that value can be derived by inferring the usage of an application on a network just by looking at mapping port values to the associated IANA assigned application. That may be one of the analysis functions of the engine 184. For example, one could just take a single flow record, take a look at the source or destination port, determine whether the port is likely a server port or a randomly assigned source port, and then lookup the corresponding application in the IANA list. However, this by itself would mean that it would be possible to use Nmap to fool the fingerprint function into reporting that every scanned port is an application that is in use. Hence, it may be desirable to see whether any data would actually be exchanged, and maybe even to try to rule out potential scanning activity. Having data exchanged is more clear cut for TCP services, but UDP servers are under no obligation to return anything to inbound attached function traffic. Also, although IANA has defined port numbers for 10,000+ applications, not all applications are of equal importance. As a result, it is an option to be selective in the fingerprinting process. Reasonable approaches include: 1) fingerprinting applications based on port values for specific enterprise applications and/or 2) fingerprinting those applications that reside in certain servers. In any case, there is value in running fingerprinting code that parses through application layer data and so the appliance 180 is configured to enable both a port-based and a DPI-based application fingerprint be produced for each flow.

The following features are examples of the types of features that may be analyzed in the pattern matching mechanism for application identification:

| Feature | Rationale | Example |
|---|---|---|
| IP protocol test | Restrict application layer inspection based on IP protocol value to follow conventional application usages of the transport layer | "tcp" |
| Transport layer port test | Applications usually communicate over canonical port values | "22" |
| Application layer string matches | Many applications can be detected with some degree of reliability simply by looking for a simple string within network traffic | "SSH/2.0" |
| Pattern offset | Some applications transmit identifiable information at certain offsets within payload data - the offset applies to a search pattern | "15" |
| Pattern depth | Some applications transmit identifiable information within certain depths of payload data - the depth applies to a search pattern | "100" |

-continued

| Feature | Rationale | Example |
|---|---|---|
| Regular Expressions | In order to partially application layer complexity, regular expressions are frequently necessary | ".+ASCII\(.+SELECT" |
| Pattern Chaining | Reliable application fingerprinting is enhanced with the ability to use multiple patterns in a single signature | "HTTP" + "application/x-shockwave-flash" |

Examples of application signature messages against AOL IM traffic are:
14:12:11 [I] 192.168.86.109:53605 192.168.4.112:5190 n/a [APP:AOL] (sp=53605,dp=5190,protocol=tcp)
14:12:11 [I] 192.168.6.49:5190 192.168.76.105:53602 n/a [APP:AOL/ICQ1](sp=5190,dp=53602)
14:12:11 [I] 192.168.76.105:53602 192.168.6.49:5190 n/a [APP:AOL/ICQ1] (sp=53602,dp=5190)
14:12:11 [I] 192.168.4.112:5190 192.168.86.109:53605 n/a [APP:AOL] (sp=5190,dp=53605,protocol=tcp)
14:12:11 [I] 192.168.6.49:5190 192.168.76.105:53602 n/a [APP:AOL/ICQ1] (sp=5190,dp=53602)

Outputs of the respective analysis mechanisms 194a-194f are shared with the scoring analysis engine 198. This engine 198 may be located in the appliance 180, the control manager 125 or other devices of the network infrastructure. It is used to collect the information output provided by the different analysis mechanisms and to combine it with other information retrieved, derived or configured to assist in determining the application which the analyzed flow is based upon as used on the network system. The history of applications previously used on the network as well as those applications know to be installed on the network may also be added to the analysis as two additional mechanisms, including as tiebreakers or added weighting, particularly when the other mechanisms deliver less than certain results, but not limited thereto.

FIGS. 4A-4C illustrate the results of using a plurality of mechanisms in the scoring to assess the likely application associated with a flow that has been mirrored to the application identification function 200, in which scores can range from 0 (no knowledge of the application based on the mechanism used) to 100 (complete certainty of the application based on the mechanism used). It can be seen that certain applications are more amenable than others to certain analysis mechanisms. For example, social and search applications can be detected with a high degree of confidence using signature analysis while peer-to-peer applications are difficult to detect using the signature approach but are detectable using the heuristics mechanism. The API mechanism shown in FIGS. 4A-4C represents the inclusion of any analysis technique created for use in association with the identification function 200 including, but not limited to, user created custom techniques of the network infrastructure 101 of the present invention. The API is the interface through which users may add one or more analysis mechanisms to the scoring engine 198 dependent on their particular experiences in a specific network application.

Figure 5:
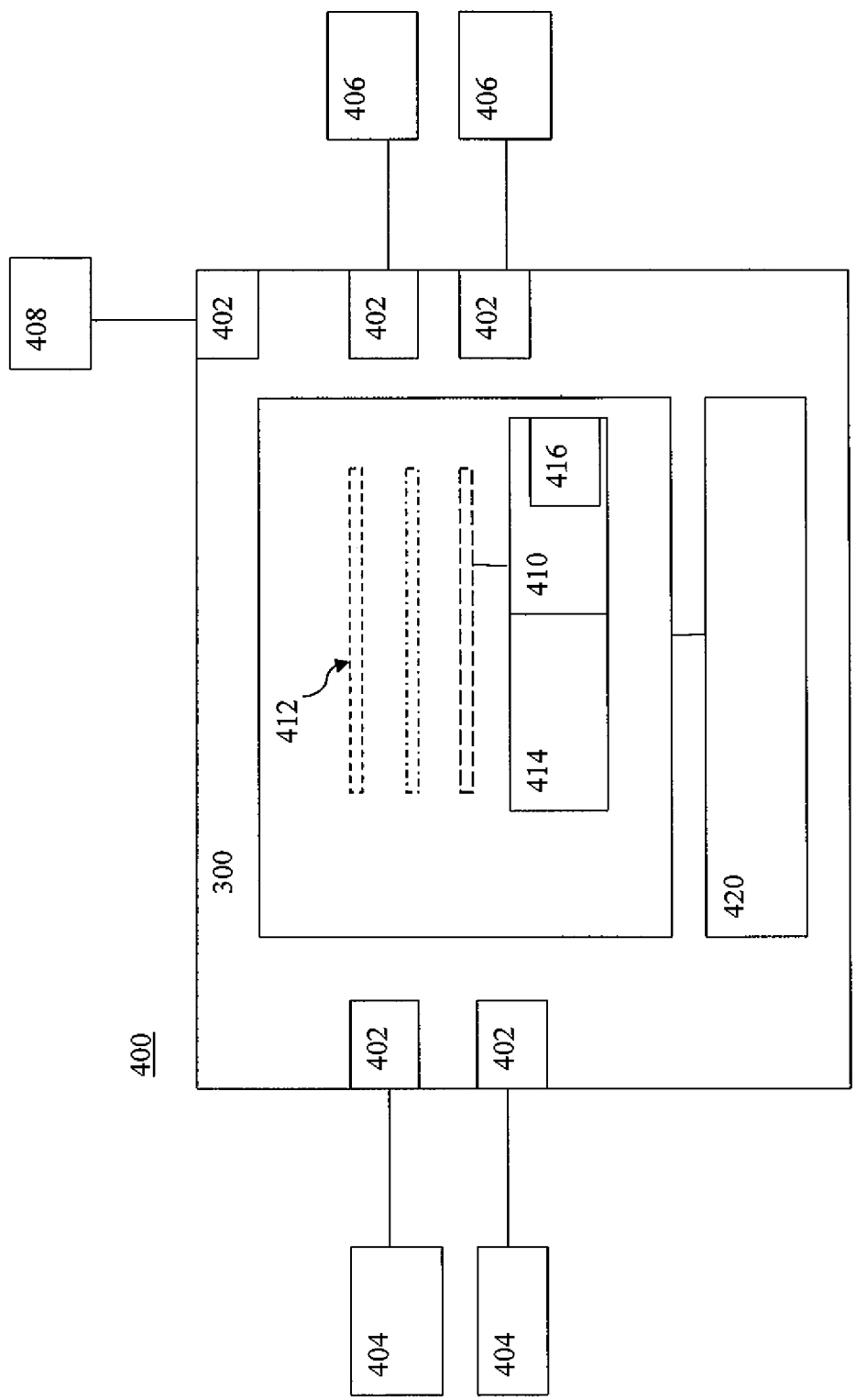
FIG. 5 is a simplified block representation of the dynamic mirroring function of the present invention in a network device.

An example of the dynamic traffic mirroring function 300 of the present invention, which may be used in conjunction with the application identification function 200 or independent of that function, is represented in FIG. 5, which is a simplified representation of a packet forwarding device 400 configured to mirror frames of packets received on the device 400, which may be part of the network infrastructure 101 and may be a network entry (edge) device of a central (core) packet forwarding device of the type previously described but not limited thereto. The device 400 includes the dynamic traffic mirroring function 300. The device 400 includes one or more ports 402 for receiving and transmitting packets. The device 400 is connected in a wired or wireless way to a traffic source 404 and a traffic destination 406. It is further connected in a wired or wireless way to a mirrored traffic destination 408. The device 400 includes a control engine 410 configured to, among other things, establish and/or manage one or more virtual portals 412 associated with the transmission of mirrored frames of a flow set up between the traffic source 404 and the traffic destination 406. It is to be noted that while they are referred to as the traffic source and the traffic destination, it is to be understood that each may be configured to transmit and receive traffic for example, in a flow between the two. The source and destination will have little or no knowledge of the traffic between them being mirrored (copied) to another device.

One or more of the virtual portals 412 may be static in configuration and one or more may be dynamic in configuration. A static configuration means that the mirrored traffic is always transferred to the same mirrored traffic destination 408. On the other hand, a dynamic configuration means that the mirrored frames are transferred to the mirrored traffic destination 408 through one or more selectable configurations. The destination may just be a service name (Any IDS, for example) and the physical destination may change based on service discovery, availability, status, or priority and loading, perhaps learned via service announcements. Any of the physical ports (402) of the device 400 may be used for the transmission of the mirrored frames as required or needed by the virtual portal. It is to be noted that the mirrored traffic destination 408 may be any device of the network system 100, including the device 400. If the mirrored traffic destination 408 is located within the device 400, the mirrored frames may be transferred by way of one of the one or more virtual portals 412 to one of the one or more other portals 412 or the virtual portal may be represented simply with a shared memory or other frame or data passing technique.

While the function of the portals 412 has generally been described herein with respect to the transfer of frames, portions of frames or portions of more than one flow for the purpose of application identification, the use of portals of the type described is not limited to that specific use. It is also possible to transfer to other devices or to other functions, whether in the same or another device, related information, such as information about the flow or flows but not limited thereto. Once a portal is established to another function, such as the application identification engine 186, for example, the portal might be used to transport related or other information for reason of security or simple ease of use, to that destination, which may be a known destination and which may be logical or physical. Further, the portal may have been established for a particular destination and that same destination may be used by other mirrors or the same mirrors for other frames or different flows. It is possible to provide information, status and flow statics, end-of-flow information, etc. which, while not part of the selected frames or filtered parts of the flow of packets, on a network, may aid, modify or enhance the function operating at the destination of the portal in performing its task. This information could, in one embodiment, be sent in an IPFIX or IPFIX extended format but other formats and protocols are possible.

Although FIG. 5 depicts a particular frame mirroring configuration for the device 400, one ordinarily skilled in the art will recognize and appreciate that other configurations are possible to enable the mirroring of frames for a plurality of traffic sources, traffic destinations and mirrored frames destinations. Moreover, the device 400 may have more or fewer ports than as shown (including only a single port) and more or fewer virtual portals than as shown.

The device 400 includes a mirror source point 414 and the control engine 410 includes a mirror sending mechanism 416, either or both of which may be implemented as software, hardware, or any combination thereof. In one embodiment, the mirror source point 414 is associated with one of the one or more portals 412. The mirror source point 414 may be configured to copy all or a portion of network traffic, such as on a frame by per frame basis, transmitted and/or received on a given port 402 or portal 412. The mirror source point 414 is configured to replicate, duplicate or otherwise copy traffic of the traffic source 404. In another aspect, the mirror source point 414 identifies the point or location of a device of the network infrastructure 101 or of an attached function network, such as a port, queue, storage or memory location, from which the mirroring of frames originates, initiates, or otherwise starts. Additionally, the mirror source point 414 may implement encryption of the traffic from the source 406 before initiating frame mirroring, alternately this service and others may be performed by the portal. For example, the mirror source point 414 may include one or more mechanisms to filter, encrypt, encapsulate, blank, scramble, or shave a frame of mirrored traffic.

The mirror function 300 in general relies upon the packet forwarding function of the device 400 for service generally known to be performed by that device. Classification and packet forwarding function 420 may be relied upon to classify frames for forwarding as needed to other ports (402) of the device 400. This same forwarding function 420 can be used to classify copy and deliver frames to the mirror function. When a mirror is established and frames needed to be sent by one or more of the portals 412 via one or more of the ports of switching device 400 to mirror destination 408, the frames are typically handed to classification and packet forwarding function 420 to be classified and forwarded according to typical switching and routing rules to the destination as defined by the mirror portal established for that particular mirroring activity. Device 400 then transmits the frame(s) from the proper port(s) 402.

The mirrored traffic destination 408 may be any function or device of the network infrastructure 101, including the device 400, arranged to receive and either transfer or analyze the mirrored frames, including a device having the application identification function 200 described herein. The destination 408 may include a function configurable to receive mirrored and acknowledge network traffic. The mirror destination point 408 may also optionally be part of the network system 100 but as part of a network infrastructure different from the network infrastructure 101. The mirrored traffic destination 408 may include a mechanism to decrypt, de-encapsulate, or un-scramble a received mirrored frame or frames. Further, the destination also contains the necessary protocol elements to provide flow control, frame acknowledgement and such matters as required by packet based transport as selected or used by the portals 412.

As noted, the mirror source point 414 may be configured to copy some or all of the traffic associated with the traffic source 404. A portion of any frame may be configured to be any granularity of the frame of the network traffic. For example, one or more fields of one or more protocol layers of the frame may be configured to be mirrored. In another example, only the data payload of one of the protocol layers of the frame may be mirrored. One ordinarily skilled in the art will recognize and appreciate that all or any portion of network traffic, such as all or any available portion of a frame, a packet, or any other protocol data unit, at one or more network protocol layers may be mirrored in practicing the operations of the present invention described herein. Although the present invention is generally discussed in relation to packets (frames as they appears on the network physical links) of network traffic, one ordinarily skilled in the art will recognize and appreciate that a frame is a bundle or unit of data, that may be in binary form, organized in a specific way for transmission. Moreover, one ordinarily skilled in the art will recognize and appreciate that any unit or bundle of data associated with any of the protocol layers may be used in practicing the operations of the present invention as described herein.

As noted, frames mirrored from the device 400 may be encapsulated. Any type and/or form of protocol and any mechanism for encapsulation may be used. The mirrored frames, whether encrypted or not, may be encapsulated using a tunneling protocol, such as a secure tunneling protocol. For example, the tunneling protocol used by the present invention may include any version and/or implementation of any of the following tunneling protocols: a Point-To-Point Tunneling protocol (PPTP), Point-To-Point Protocol over Ethernet (PPPoE), Point-To-Point Protocol over ATM (PPPoA), a Layer 2 Tunneling Protocol (L2TP), a Generic Routing Encapsulation (GRE), Internet Protocol Security (IPsec), IP in IP Tunneling, and Multi-Protocol Label Switching (MPLS). One ordinarily skilled in the art will recognize and appreciate that any bridgeable or routable protocol may be used in practicing the operations of the present invention described herein.

In one embodiment, mirrored data of an original frame in a packet becomes the data payload for a modified packet that includes the original frame that is to be mirrored. The frame to be mirrored may be encapsulated such as with a tunnel configuration. Furthermore, the content of the mirrored frame may be encrypted.

In other embodiments of the invention, the network traffic is tunneled to the mirror traffic destination 408 via a higher level protocol, such as HyperText Transfer Protocol Secure (HTTPS) or the Secure Socket Layer (SSL) protocol. For example, the mirrored network traffic may be encrypted and encapsulated via a secure web session using SSL and/or HTTP between the mirror source point 414 and the destination 408.

Figure 6:
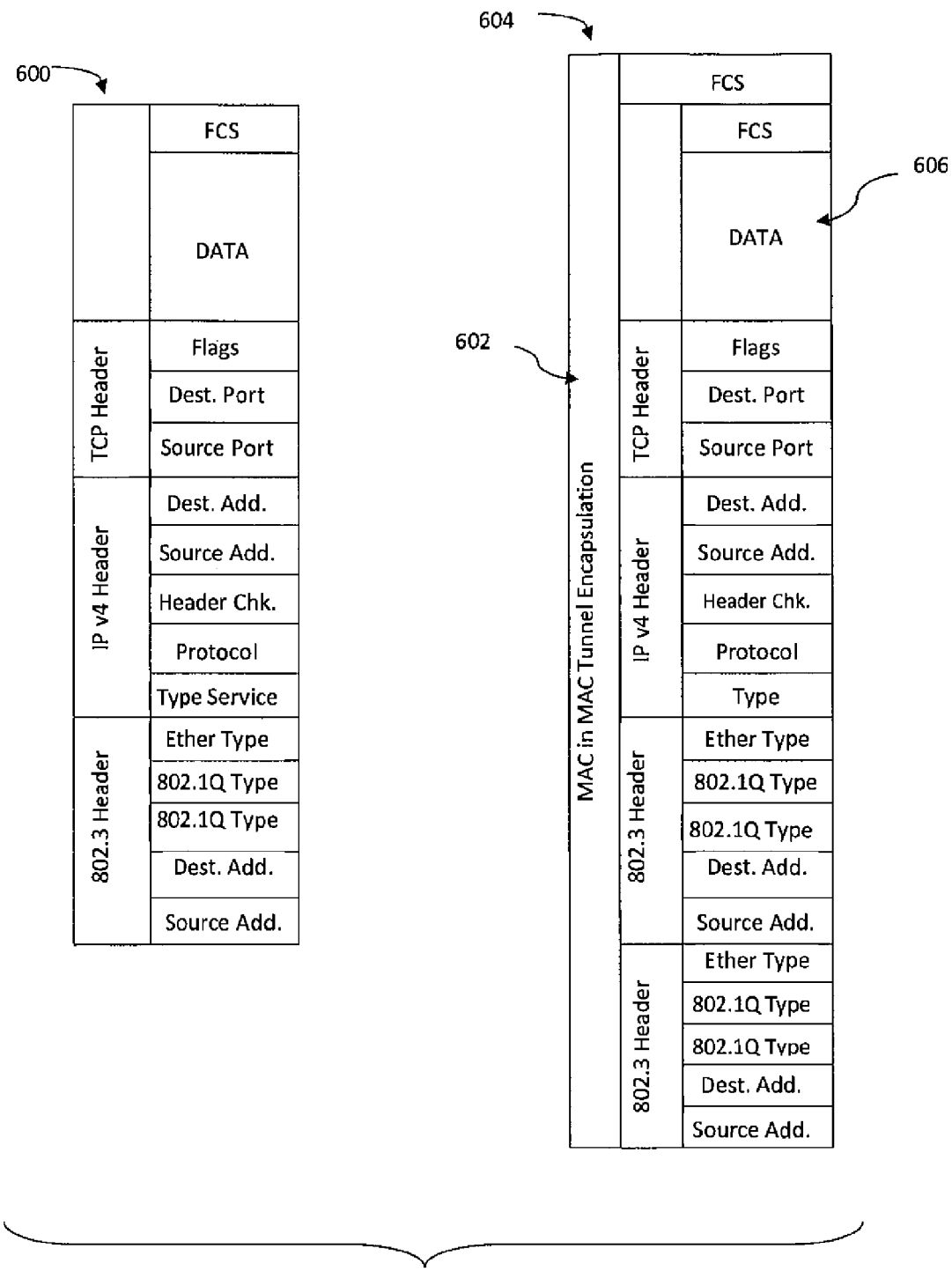
FIG. 6 is a representation of a packet modification encapsulating a frame or portion of a frame to be mirrored.

In one embodiment, a Medium Access Control (MAC) Layer 2 tunneling may be used. A MAC-in-MAC tunneling techniques encapsulates a MAC frame with another MAC header, or a second MAC header. FIG. 6 shows a simplified illustrative example of an original frame 600 of a packet of network traffic to be mirrored modified in accordance with the technique of this particular tunneling method. Specifically, the frame 600 is encapsulated in a MAC-in-MAC tunneling protocol. A second IEEE 802.3 MAC header 602 is appended to the frame 600 to form a modified frame 604 that is mirrored. In some embodiments, all or a portion of the frame 600 encapsulated with the second MAC header 602 may be encrypted. For example, data portion 606 of the frame 600 may be encrypted.

Additionally, the encapsulation of mirrored network traffic may be used with virtual leased line technologies and/or the Multiple Protocol Label Switching Standards, such as the Pseudo Wire Emulation Version 3 standard (PWE3). Furthermore, any type and/or form of custom or proprietary encapsulation protocol, or any type and/or form of custom or proprietary encrypting and encapsulating protocol may used with the present invention. One ordinarily skilled in the art will recognize and appreciate the various types and/or forms of encapsulating or tunneling protocols that may be used for providing data privacy of at least a portion of mirrored network traffic during communications between the mirror source point and the mirror destination point. The mirrored traffic may be de-encapsulated and/or de-crypted at the destination 408 for further processing.

In some embodiments of the present invention, the device 400 or other devices including the dynamic traffic mirroring function 200 may support the ability to mirror network traffic remotely over a network by utilizing the IEEE 802.1Q VLAN tag/field of the frame in a virtual LAN environment (VLAN). VLAN environments are based on logical connectivity overlay of the physical network, and as known to those ordinarily skilled in the art, may include any type of VLAN, such as a port-based VLAN, MAC-based VLAN, a protocol-based VLAN, or an ATM VLAN. In a VLAN environment, remotely mirrored network traffic may have a specific IEEE 802.1Q VLAN tag used by device 400 to help direct the mirrored network traffic to a specified location and to isolate it from other traffic. Utilizing the VLAN tag, the frame relay logic of the device 400 typically used for forwarding frames is enhanced. Network traffic mirrored in a VLAN environment may traverse or pass through many network system devices before reaching the mirror destination point 408. Regardless of the particular mechanism for transferring mirrored traffic, the dynamic mirroring function 200 is arranged to configure one or more of the portals 412 to mirror one or more packets, including portions of packets, based on selected criteria. The configuration has several dynamic aspects to it and there are a plurality of criteria used in making a determination as part of dynamic mirroring policy of what, where and when to mirror. A first criterion involves selecting one or more received frames for mirroring, which may be a flow that is defined and selected. A second criterion involves selecting one or more portions of the frames for mirroring, which may include the entirety, of the frame, selected fields or excluded fields selected portions of a frame based on byte count, of each of the frames of the selected one or more of the received frames to be mirrored. A third criterion involves selecting which of the one or more portals through which to mirror the frames. A fourth criterion involves selecting where to mirror the frames which may determine the portal or may dynamically establish a new portal. A fifth criterion involves selecting when to stop the mirroring of the selected frames. A second dynamic aspect of the present invention includes a configuration of the control engine 410 to change the configuration of the selections and/or the selected criteria for the mirror function, even during the active mirroring of frames, based upon the detection of a triggering event or condition. Examples of such triggering events or conditions have been described above and are incorporated herein but the invention is not limited to those so listed.

The portals 412 may be configured by any means known to those skilled in the art, such as through the use of SNMP, to provide the parameters needed to determine or discover the portal destination, path to it and the transport criteria needed. As an example, a mirror may have been established by the policy-based mirroring function to mirror all traffic from a new attached function that has joined the network system 100. After a period of time based on one or more of policies, on the output of an IDS, the output of the appliance 180 or another network infrastructure device including the application identification function 200, and Network Access and Control (NAC) functions, the particular attached function might have the criteria for mirroring changed to reflect only mirroring, for example, the first 30 frames of a new flow to only the least loaded application identification function 200 of the network infrastructure 101. This might reflect an attached function now having a trusted, known, authenticated user, updated applications and virus detection status, and generally displaying good network behavior.

It is also to be noted that the control engine 410 configured to change the mirroring dynamically may be located in one or more other devices of the network infrastructure 101. Further, the control mechanism of the traffic mirror function may be automatically changed during the mirroring of traffic based on input of information to the control engine 410 that initiates a mirroring change based on network policy, mirroring policies or both. The first selection criterion may be based on a field or selected fields in the packet. The selected field or fields may be one or more of: a) address fields; b) protocol fields; c) length or byte count fields; and d) fields used in determining the value, meaning, placement or inclusion of other fields in the packet. The second selection criterion may also be a selection of the fields in the packet to be mirrored, byte count of a first selected portion of the packet to be mirrored and/or offset of a first selected portion of the packet to be mirrored. Further, the third selection criterion may be: a) a count setting of the frames meeting the first selection criterion; b) created using information contained in the packets mirrored or to be mirrored; c) created using information contained in packets not mirrored to the selected portal where mirroring occurs. The application layer of the packet or series of packets may also be used as either or both of the first and second criteria. The control engine 410 is configured to include one or more inputs used in the analysis of what and when to mirror traffic from the traffic source 404. Input options include, but are not limited to: a) network events; b) application(s) detected; c) user authentication; d) type of device for the traffic source 404 or the traffic destination 406; e) device status (virus level); f) device ownership status (BYOD criteria); g) network policies; and other triggering conditions as noted herein. Each of the one or more portals 412 may be established through the device 400 in one or more ways as described herein. For example, the portal 412 may be a tunnel to another device of the network system 100 including, for example a TCP/IP tunnel. It may also be based on packet encapsulation. That data encapsulation may be a data link sub-layer encapsulation. Further, it may be based on the traffic destination 406.

The ability to detect and identify applications running on devices of the network infrastructure 101 enables a new type of application based network control. However, it comes at a cost of increased complexity and expense to deploy the application identification function 200 in the network infrastructure 101. Normally, the application identification function 200 including the engine 186 would need to be deployed throughout the network infrastructure 101 to insure a reasonable detection of a sufficient portion of the traffic flows important to the organization to permit reasonable control. The dynamic traffic mirroring function of the present invention dramatically eases the pain, expense and complexity of engine 186 deployment allowing such application identification engines to be placed almost at will by the network administrator, with the mirrors bringing to it the necessary traffic from any device of interest in the network infrastructure 101. The dynamic mirrors are most logically located in the switches and other devices that are primarily packet forwarding devices, such as switches and routers, as the incremental additional cost is relatively mirror and heavily leverages the already existing capabilities these devices have; namely, to classify all incoming traffic, copy traffic as needed, rapidly modify frames and frame headers, filter and forward frames, and to support encapsulations, tunneling and routing technologies. Moreover, their positions in various network topologies make them almost ideal for the task.

Figure 7:
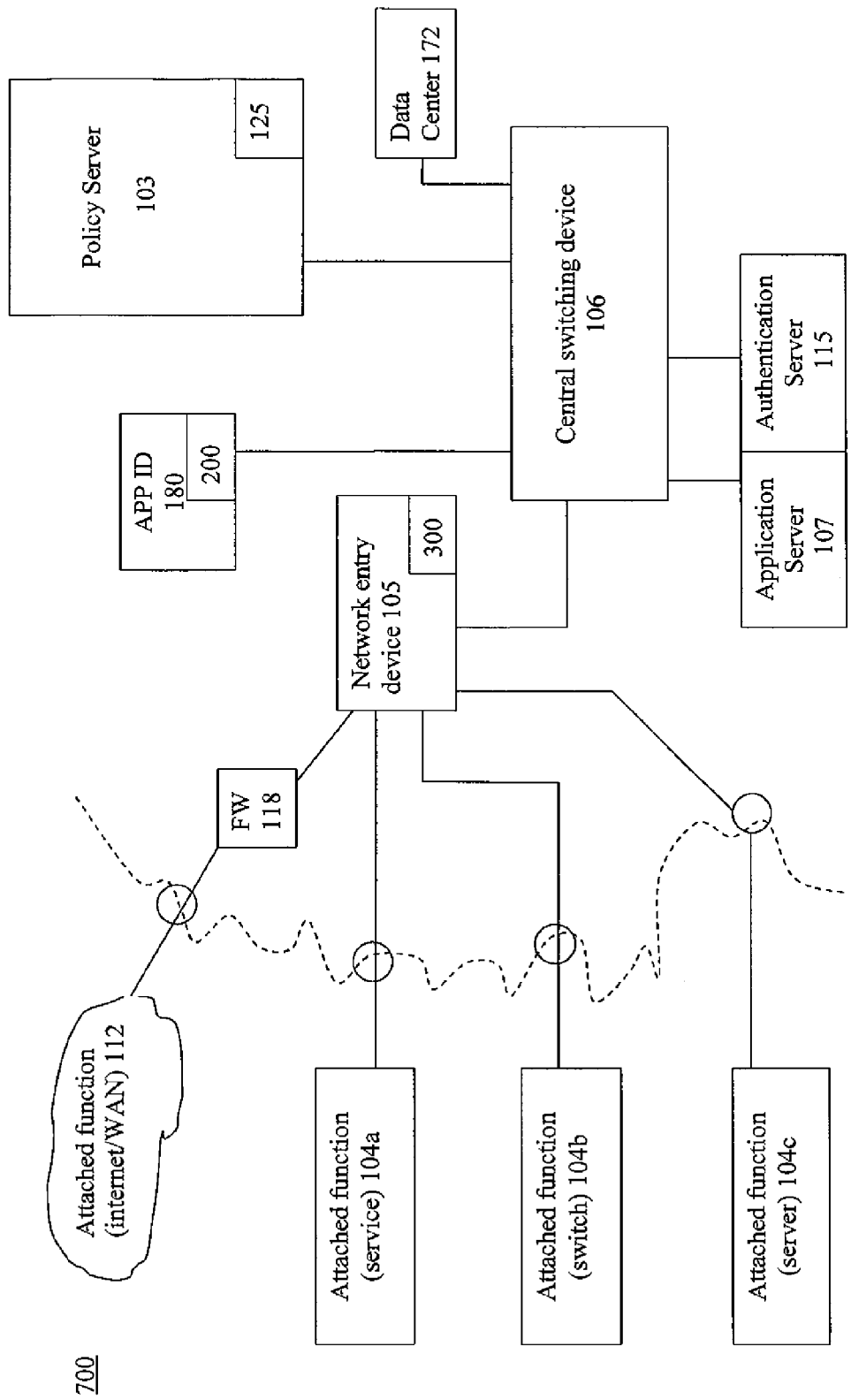
FIG. 7 is a simplified block representation of a first network topology arrangement using dynamic mirroring and application identification.

Examples of network topology organizational options are shown in FIGS. 7-10. Components of the network that are numbered the same as in FIG. 1 remain the same for purposes of describing the different topology options. FIG. 7 shows a first network topology 700 in which transmissions from attached functions to the network infrastructure 101 enter through edge network devices and all Internet traffic is forced through firewall 118, which may be one or more firewalls scaled as desired based on the size of the network. The firewall 118 performs its gate keeping function and packets that are permitted to pass are transferred to the network entry device 105, which represents one or more network entry packet forwarding devices, such as switches. The network entry device 105 mirrors frames of the packets or portions of one or more received frames to the application identification appliance 180. The appliance 180 carries out its analysis with the application identification function 200 as described herein and passes that information to the policy server 103 or another network control device including the network control manager 125. The policy server 103 either has established one or more network policies, which may include one or more mirroring policies and/or rules for implementing mirroring policies, on the network entry device 105 or firewall 118 for the purpose of allowing, blocking or restricting the transfer of frames from the network entry device 105 to the core switching device 106 and/or access to resources of the network system. Dependent upon the analysis of the frames mirrored to the appliance 180, the policy server 103 or the manager 125 may dynamically adjust one or more network policies or enforcement rules of firewall 118 or the network entry device 105, the core switching device 106 and/or any other devices of the network.

In a small business model network represented in FIG. 7, network entry device 105 may represent most or all the network switching devices of the topology 700. In small topologies, the management, policy control, and application identification function 200 may all be located in a single server. For the small business office, Internet connected to the corporate backbone, the network control and application identification function may, in fact, be located at the corporate headquarters. High priority mirroring may take place immediately for new flows while local logging and nightly transfer and analysis may optimize network cost at some delay in terms of policy control and enforcement. As traffic grows, or a more responsive control is needed, local application identification engine could be installed as a standalone appliance, such as in appliance 180, or as a function of a packet forwarding device, perhaps sharing the load with the corporate-based primary application identification function 200, with the dynamic mirrors providing the traffic to the appropriate device based on mirror policy. While the point deployment of the mirrors would lead to no duplicate flows, if more than one switching device were installed in the network, some traffic in the other device, assuming no local mirror, would not be reviewed by the application identification function(s) 200. A point deployment works well where the traffic in the network is typically focused through a single, or a limited set of packet forwarding devices. Internet gateway and data center entry points are good examples of places where mirror deployment would see little duplicate traffic and a very large portion of the traffic flows through a single or very limited number of packet forwarding devices.

The simplest topology case to understand is the firewall or gateway access, such as a VPN, topology. In this topology, specific traffic is focused through a single point or very limited set of points when including load sharing and redundancy. These single points may be easily mirrored and there is almost no duplication of flows to be concerned with. In addition, it is a likely a high-concern or high-risk location, but with limited or known bandwidth requirements. A more complex topology is the edge access device topology. Those network devices typically connected to one or two devices (attached functions) located in every office of an enterprise, as an example. Low density user devices are tied to the core of the network using lots of ports, different locations and, typically, multiple edge devices. While a single port may not represent much traffic bandwidth, the aggregate of all ports can become substantial. Mirrors can be created on a per port or per entry device basis but any enforcement usually requires a mechanism to track addressing back to the physical port of entry devices as an added step when compared to the gateway topology. The increased bandwidth of high traffic spikes may also force a less holistic approach to mirroring; that is, you cannot analyze everything during high traffic periods. A new policy may be needed for load shedding and establishing priorities for excessive traffic in the mirrors or at the destination devices, such as application engines. Sampling flows, shedding trusted users, limiting the time period of examining all flows from a device or user are some such techniques to use dynamic mirroring to limit load to application identification, IDS and other monitoring engines.

Figure 8:
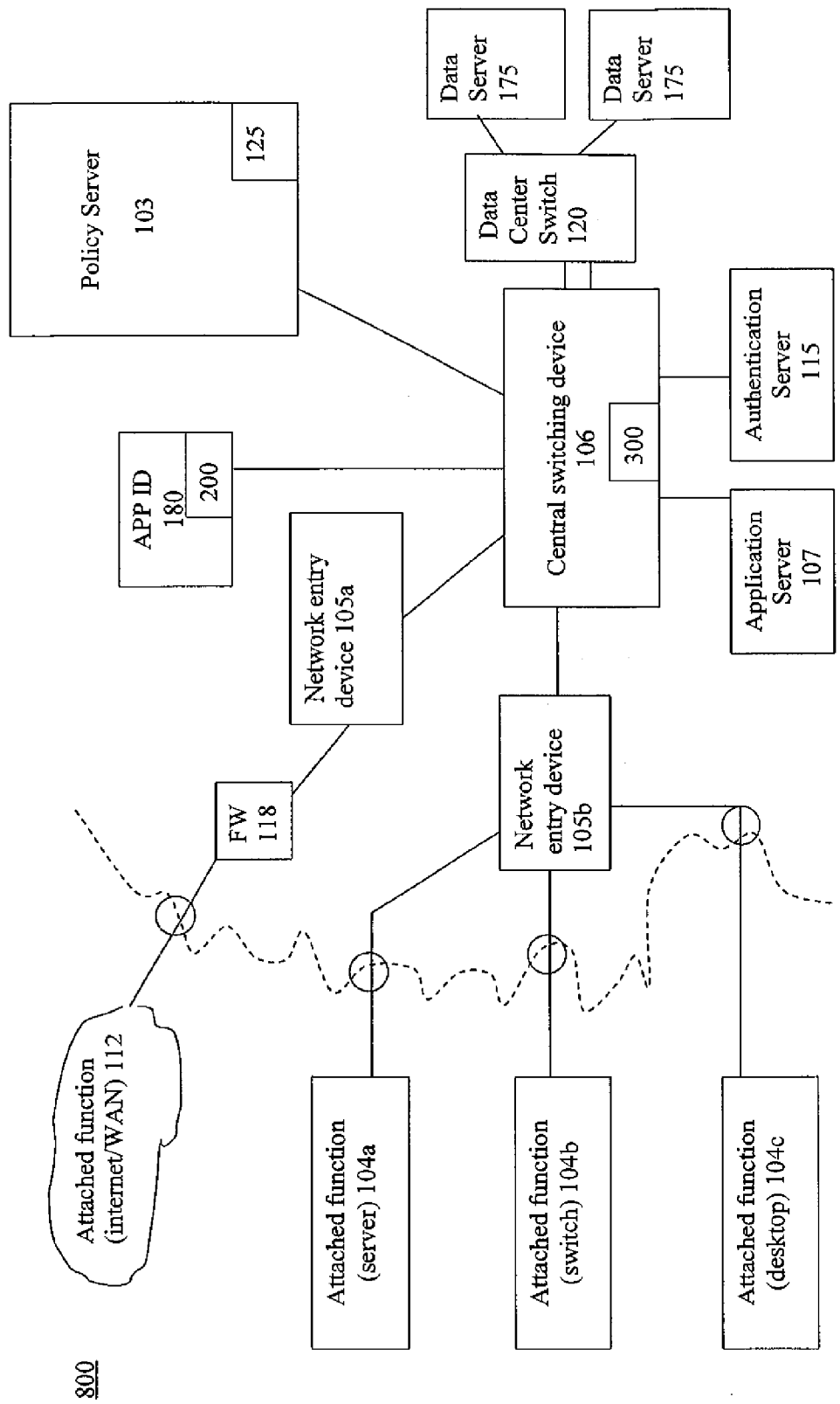
FIG. 8 is a simplified block representation of a second network topology arrangement using dynamic mirroring and application identification.

FIG. 8 shows another network topology 800 and may represent a typical medium size enterprise with both core and edge switching. Transmissions from the majority of the attached functions of the network infrastructure enter through the edge switching devices 105a and 105b. The network entry devices 105a and 105b do not include the dynamic traffic mirroring function 300 or they do not utilize that function to mirror frames to the appliance 180. Instead, the network entry devices 105a and 105b forward frames in packets to the core device 106. The topology location of the core device 106 means the vast majority of all flow in the network passes through that particular packet forwarding device. Any application identification functions 200 directly attached to the core device do not significantly increase traffic in the network when mirrored to a dedicated port on the core device. The appliance 180 carries out its analysis with the application identification function 200 as described herein and passes that information to the policy server 103 or another network control device including the network control manager 125. The policy server 103 either has established one or more policies, including one or more mirroring policies and/or one or more rules for implementing mirroring policies, on the network core device 106 for the purpose of allowing, blocking or restricting the transfer of frames from the network core device 106 to other devices of the network including attached network functions. Dependent upon the analysis of the frames mirrored to the appliance 180, the policy server 103 or the manager 125 may dynamically adjust one or more policies, including mirroring policies, of the network entry device 105, the core switching device 106 and/or any other devices of the network.

Figure 9:
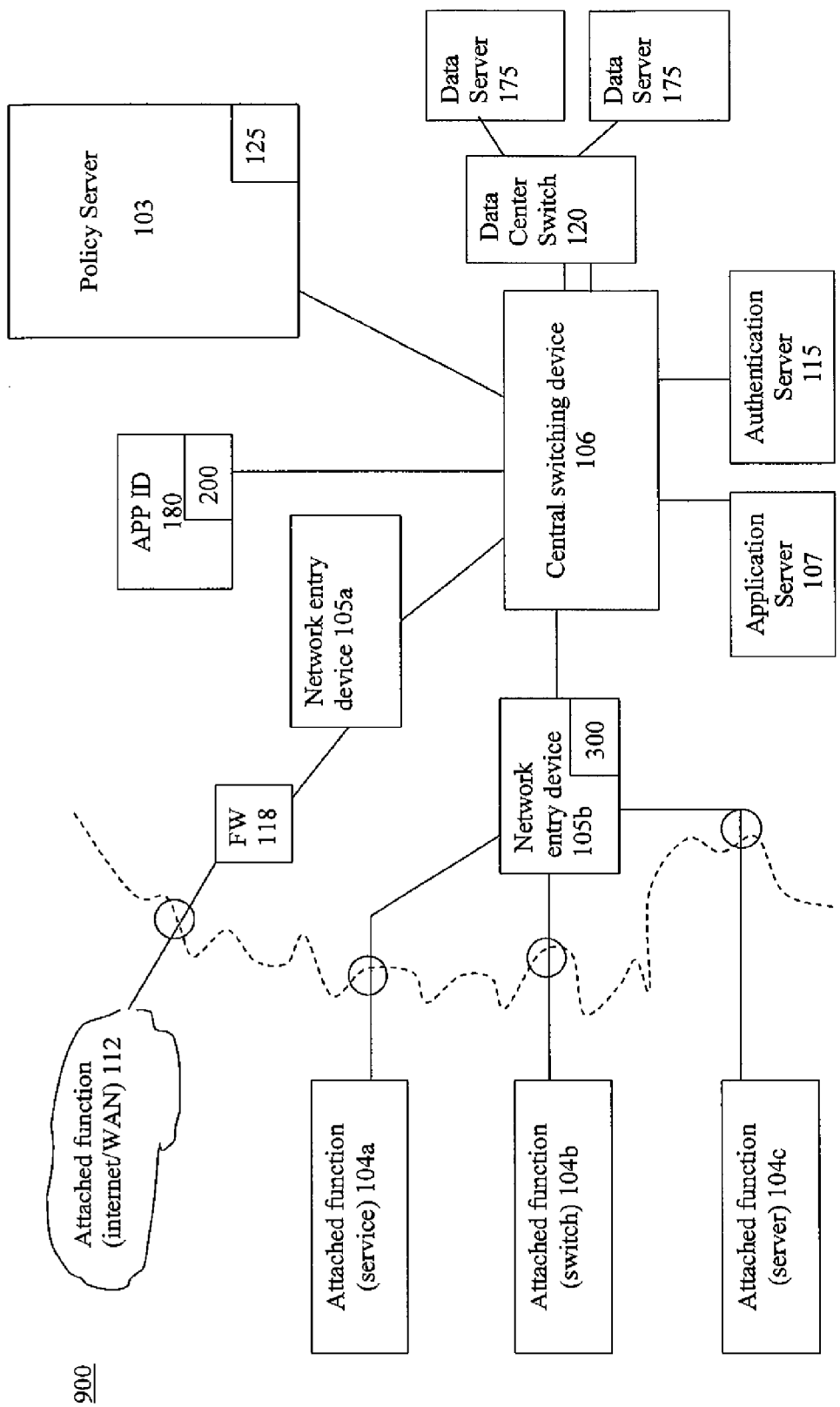
FIG. 9 is a simplified block representation of a third network topology arrangement using dynamic mirroring and application identification.

The network topology 900 of FIG. 9 includes network core focused application identification and uses the output of appliance 180 to assist in policy decisions for securing the network. Rapid policy deployment of control in the core device 106 may be followed by discovery of the flow source and subsequent edge deployment at either or both of network entry devices 105a and 105b, for example, of more targeted control. Where some, but limited, mirroring capability may exist at the network edge and/or large numbers of users exist, core detection may be followed by limited mirroring with added detection at the edge. This may lead to duplication of flows and an increased requirement to de-duplicate at the appliance 180 or one or more other devices of the network infrastructure 101 that include the application identification function 200.

Figure 10:
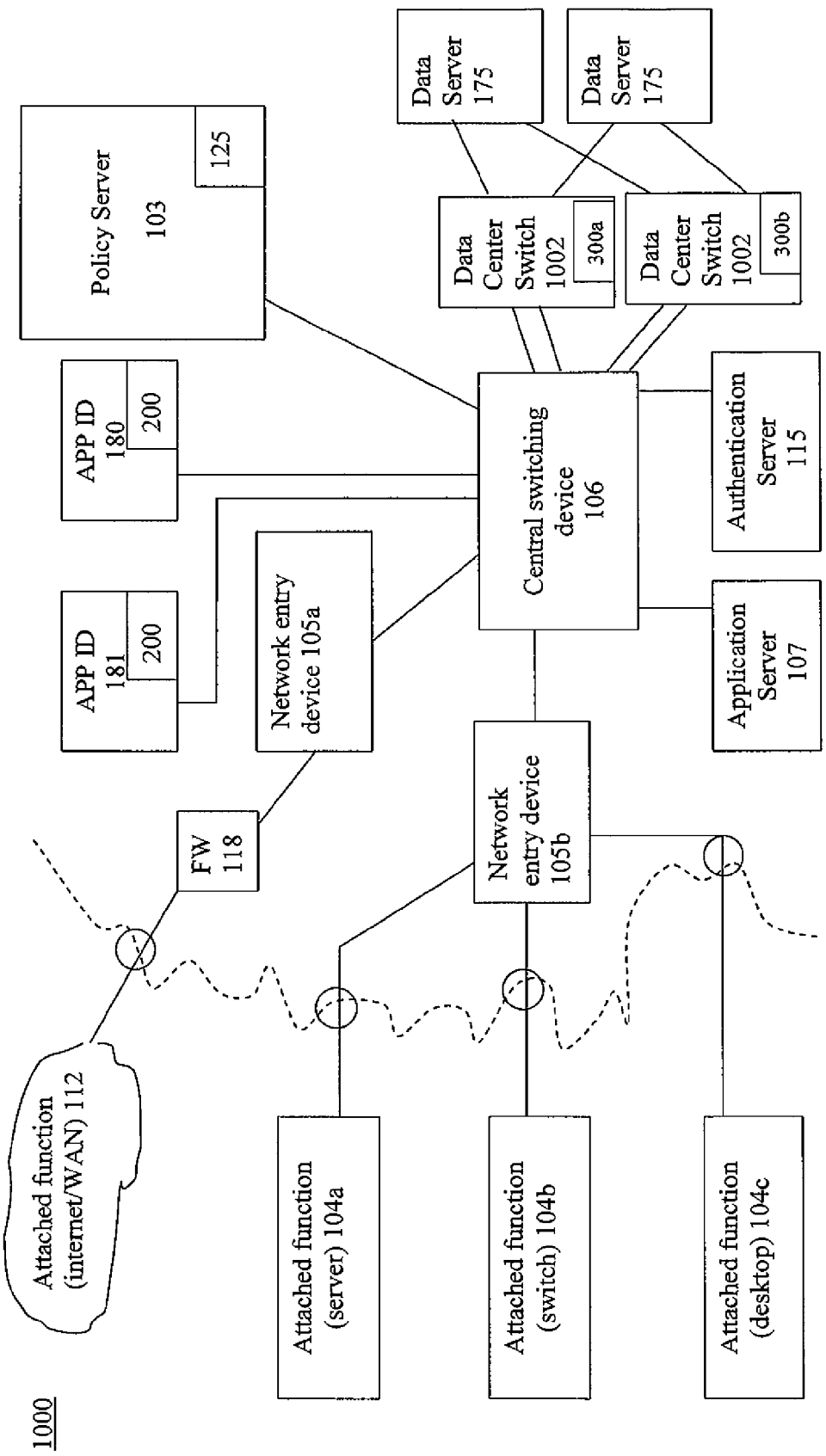
FIG. 10 is a simplified block representation of a fourth network topology arrangement using dynamic mirroring and application identification.

FIG. 10 shows another network topology 1000 suitable for use with a data center wherein one or more servers 175 of the data center are a core asset to the enterprise. Within the enterprise, traffic from the network entry device 105a/105b, which represent network entry packet forwarding devices, such as switches, passes eventually to a data center switch 1002 or equivalent packet forwarding device(s). The data center switch 1002 or equivalent forwarding device(s) forwards frames to and from a server or set of servers that represent a data center 1004 through the network core packet forwarding device 106, which may be a switch or a router and may be one or more devices in practice. The network entry devices 105a and 105b do not include the dynamic traffic mirroring function 300 or they do not utilize that function to mirror frames to the appliance 180. Instead, the network entry device 105a/105b forwards the frames to through the core switch and on to data center switch 1002. Frames are mirrored, if applicable, by mirror function 300a or 300b to application identification engines of appliances 180 and 181. The appliances 180 and 181 carry out their analysis with the application identification functions 200 as described herein and pass that information to the policy server 103 or another network control device including the network control manager 125. The policy server 103 either has established one or more policies, including for mirroring, on the network devices for the purpose of allowing, blocking or restricting the transfer of packets as required. Generally, enforcement is attempted first at the lower bandwidth edge devices closer to the entry point of potentially harmful behavior when possible, but in any device of the network infrastructure 101 as needed to support the network. Dependent upon the analysis of the frames mirrored to the appliance 180 and/or 181 and possibly others as needed, the policy server 103 or the manager 125 may dynamically adjust one or more policies, rules, Access Control Lists (ACLs) or parameters of the network entry device 105a/105b, the core switching device 106 and/or any other devices of the network.

The architecture 1000 of FIG. 10 is focused on understanding the applications and usage of the data center 175 devices. Based on traffic mirroring at the data center switches 1002, the appliances 180 and 181 would receive little duplicate traffic. However, data center switching can be some of the highest volume of traffic in the network and multiple mirrors, links, application identification engines and servers may be needed to support the topology. One of the more important aspects of the architecture is the ability and flexibility to support and scale to each of the topologies as shown with a few pieces of basic technology and to perform this in a cost effective manner. A pervasive mirroring topology supports mirroring at all the packet forwarding devices of the network system. While providing unlimited access to the packet flows, duplication of the frames at the mirrors of each switch would require more intelligent control of them, perhaps mirrors that understand topology, or de-duplication of the flows at the monitors and engines receiving the mirrored frames. Additional intelligent mirror control and new policies may be added to help ease the duplication effect using both approaches.

The network architecture supporting the various topologies described herein are examples of configurations that may be created where knowledge of applications and topologies associated with flows exist, as well as the ability to mirror some or all of such flows to obtain application identification and usage information. It is also advantageous to have the ability to conduct mirroring activities dynamically, including when to mirror, how much to mirror, which devices to use for mirroring and when to stop mirroring. Moreover, it is also advantageous to configure such topologies including the ability to modify dynamically network policies associated with the operation of the network as a result of events, conditions, status, etc., detected based on application information but not limited thereto.

The application identification end-to-end network architecture of the present invention expands the control network administrators have on existing networks. Application identification and usage data, by user, by device and network location can now be used to provide an added level of network control. However, application identification engines come at a cost, perhaps more than the cost of IDS engines currently in use. The ability to embed the application identification technology into all switch devices would be prohibitively expensive. Dynamic mirror technology can be used to bring the packets to the device having the application identification engine while also providing an elegant transition step which may, in fact, be the glue for the virtual placement of all types of monitors, IDS, application identification, data loggers, and even server technology well into the future. The portals described herein allow the mirrors to transport whole or filtered flow data from anywhere, to anywhere in the network, efficiently and securely. The architecture implemented functions allow the ability to start small with a single application identification function 200 added to a network management server, examine flows from throughout the network (via mirroring) and upgrade policy control based on real application identification data and usage, then grow to pervasive deployment where virtually all new flows could be identified and controlled via policy. This ability to scale across small to very large topologies is an aspect of the control architecture. Scaling may be accomplished by determining a comprehensive or specific level of network activity that could be handled by a single application identification engine and mirroring frames to that engine. Additional application identification engines can then be added as needed, each time the level of network activity exceeds the capacity of the installed application identification engines. It can be seen that this can be done for a wide range of network sizes. As new application identification engines are added to a network system the dynamic mirrors could locate the least loaded engine and new flows would automatically be sent to the least loaded engine. This allows near seamless upgrades as needs grow or traffic increases. This eliminates the limitations of piecemeal and/or manual control of network operations even when application information has been acquired. This architecture enables substantially complete application visibility and control. Previous technologies were cobbled together in order to achieve partial application visibility and control in pieces, such as manual Access Control List (ACLS) but that is not enough to maximize network efficiency and provide real security. This architecture provides: a) effective, inexpensive mirroring at the network ingress point for new flows, which aids in determining the source of an identified application; b) cost efficiency, locating expensive application identification engines strategically, including at the core rather than introducing them to all or a limited set of the network packet forwarding devices. The ability to filter (by packets, fields, bytes, etc. as described herein) including through dynamic traffic mirroring is useful in minimizing network traffic and application identification engine overload. The network operation is enhanced through this architecture because it enables effective dynamic network policy, including policy enforcement at an ingress point based on knowledge of a source of undesirable activity on the network.

A simple example of the applicability of the architecture and its associated dynamic mirroring policy as well as traffic mirroring to more centralized services and application identification will help illustrate the value of the present invention. In this example, a new user authenticates to the network at the network entry device 105 using a computing device as the attached function. The user's identification is known based on content in a database associated with the authentication server 115. However, in the course of authentication, it is determined either through the authentication server 115 or the policy server 103 that the user device is an unknown one. A defined dynamic mirror policy has been established in the network entry device 105 for all unknown attached function devices. Based on the defined dynamic mirror policy and knowledge that the device is unknown, all flows associated with the user are automatically mirrored to an IDS for a specified period of time and all new flows established by that attached device are mirrored for the first 20 frames to the appliance 180. The mirroring to the IDS would be halted, assuming no condition exists to warrant further monitoring in that regard, after a set time period and that particular IDS could be used to monitor the traffic from another device, the assumption being that if no undesirable event has occurred within one hour, the attached device can be more trusted from a security perspective. At the same time, all new flows would continue to be monitored and analyzed by the appliance 180. The appliance 180 would identify applications running on the attached device. That information would be collected and the user's application usage tendencies could be characterized and logged over a period of time. That information and the actions of the network entry device with respect to mirroring activities may be aggregated such as in a mirror policy engine of the manager 125. Mirroring to the appliance 180 could be adjusted as desired, including reducing the number of flows mirrored or selecting certain flows or types of flows to be mirrored. In a situation wherein there exists a mirroring or traffic overload at the network entry device, another network device (in the flow path for the attached device) may be used to dynamically establish a mirror for a flow or all flows that could not be accomplished in the network entry device for that attached function. As noted, the appliance 180 would learn and log the applications detected as being used by the user on the attached device and further network policies could be applied dynamically or statically based on the discovered applications in use.

Figure 11:
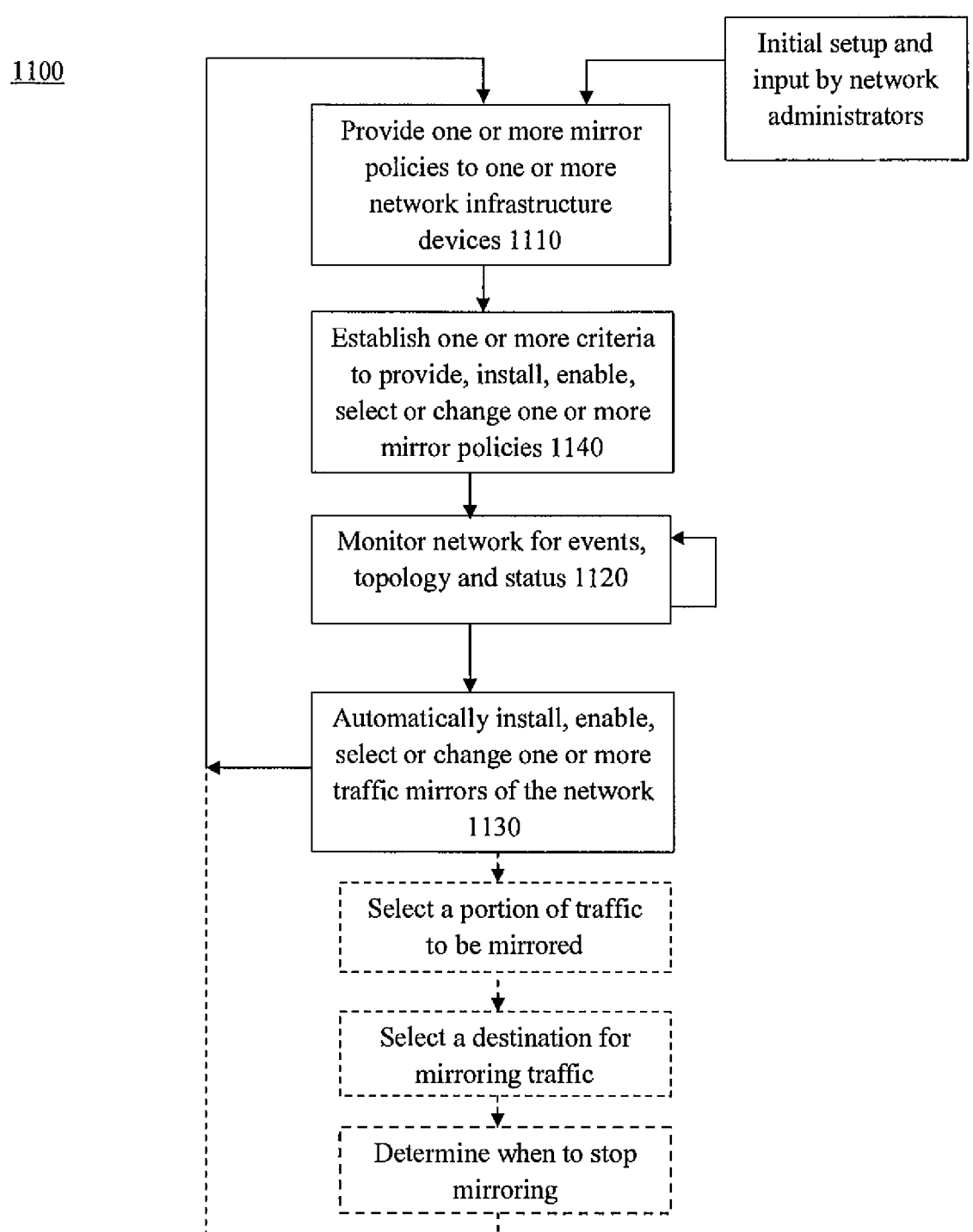
FIG. 11 is a simplified flow diagram of primary steps associated with a method for controlling dynamic traffic mirrors with mirroring policies.

As represented in FIG. 11, a method 1100 of controlling dynamic traffic mirrors of the network system includes, after standard initial setup of one or more devices of the network infrastructure 101 through network administration input as is typically done in the field of the present invention, step 1110 of providing in the one or more of the network infrastructure devices 101 one or more mirror policies. In step 1120, the network system 100 is continuously monitored for events, topology and status of the network system. Dependent on the information gathered in the monitoring, the method 1100 further includes step 1130 of installing, enabling, selecting or changing automatically one or more traffic mirrors in one or more of the devices of the network infrastructure 101. The one or more of the one or more mirror policies provided, installed, enabled, selected or changed implement one or more network policies of the network system 100 and/or one or more rules based on one or more network policies. The method 1100 further includes as part of step 1100 or in addition to step 1100 before or after that step, step 1140 of establishing one or more criteria for the providing, installing, enabling, selecting or changing of the one or more mirror policies based on the one or more network policies of the network system 100 and/or the one or more rules based on one or more network policies. The method 1100 optionally provides under step 1130 the step of selecting one or more of the one or more network infrastructure devices from which to mirror the network traffic based on one or more of the one or more criteria.

The method 1100 includes the optional step of selecting a destination for the mirrored traffic based on one or more of the one or more criteria. The destination may be one or more of: a) one or more of the plurality of network infrastructure devices 101; b) one or more network services; c) a function of the network system 101; and d) a portal 412. The method further includes the step of selecting a portion of the network traffic to mirror. The selected portion may be any one of: a) a flow of packets; b) a set of packets within a flow; and c) a portion of one or more frames of one or more packets within a flow. Another optional step of the method 1100 is determining when to stop the mirroring of the network traffic. The stopping may be based on one or more of: a) one or more of the one or more criteria noted above; b) one or more mirror policies or one or more network policies; and c) one or more priorities of one or more other network traffic flows. The method 1100 also includes the optional step of securing the network traffic to be mirrored prior to mirroring. That securing may be accomplished by one or more of: a) providing a tunnel; b) encrypting the content of the network traffic; and c) providing an encrypted tunnel. Examples of mirror policies that may be established include, but are not limited to: a) allowing a source of the mirrored network traffic to choose the destination of that mirrored network traffic; b) mirroring selectable network traffic based on an attached function or user generating the network traffic to be mirrored or content of the network traffic to be monitored. The mirror policies established may be based on one or more of: a) a role of an authenticated user of the network system 100; b) a device using the network system 100; c) a type of a device using the network system 100; d) local packet classification; e) time of day; f) other events which may be monitored; and network policies. The method 1100 further optionally includes the step of storing the one or more mirror policies in the one or more devices of the network infrastructure devices 101. Those stored one or more mirror policies may be changed.

Figure 12:
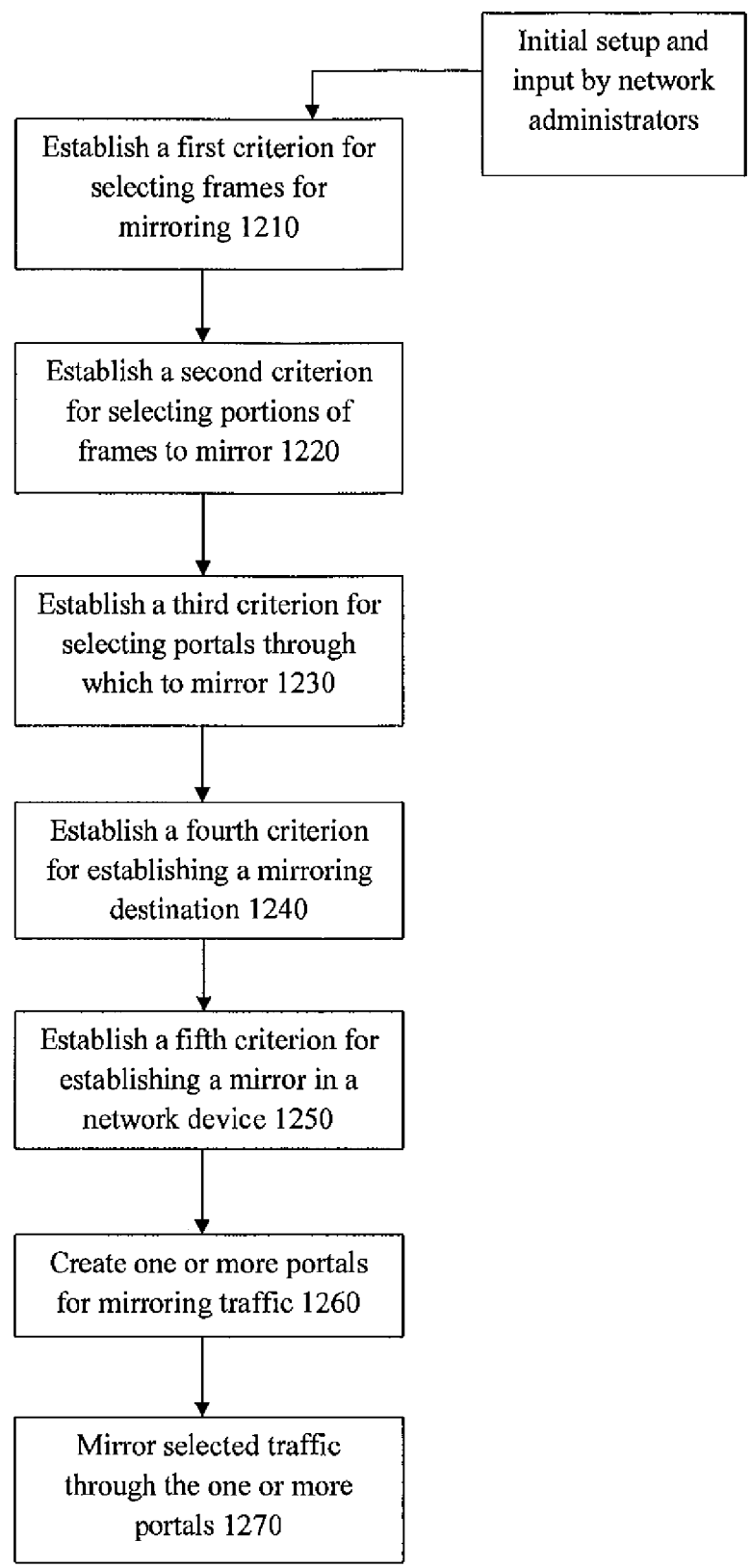
FIG. 12 is a simplified flow diagram of primary steps associated with a method for dynamically mirroring network traffic.

As represented in FIG. 12, a method 1200 is provided for mirroring one or more frames of one or more packets of a flow established in a network system signal exchange. After standard initial setup of one or more devices of the network infrastructure 101 through network administration input as is typically done in the field of the present invention, a first step 1210 of the method 1200 is to establish a first criterion for selecting one or more received frames for mirroring. A second step 1220 is to establish a second criterion for selecting one or more portions of the frames for mirroring. A third step 1230 is to establish a third criterion for selecting one or more portals through which to mirror the frames. A fourth step 1240 is to establish a fourth criterion for establishing a destination for the mirrored frames. A fifth step 1250 is to establish a fifth criterion for the establishment of a mirror in a device of the network infrastructure. The established criteria are used in step 1260 to create one or more portals 412 in one or more of the plurality of devices of the network infrastructure 101 meeting the criteria for establishing a mirror to mirror the selected frames. The method 1200 then includes step 1270 of carrying out the mirroring of the selected frames through the created one or more portals 412. An optional step of the method 1200 is to change one or more of the criteria. The method 1200 further includes the optional step of establishing a sixth criterion for stopping the mirroring. The method 1200 includes an optional further step of modifying automatically the mirroring of the selected frames during mirroring.

The mirroring instructions associated one or more of the criteria may be generated, changed, modified or otherwise adjusted based on one or more of: a) network events; b) applications detected; c) user authentication; d) type of the device; e) status of the device; f) ownership of an attached function attached to the device; and g) triggers. The method 1200 includes the option as part of step 1260 the step of establishing an encapsulation for the frames to be mirrored via the one or more portals 412. Portal selection may be carried out under the method 1200 based on one or more of: a) source address, destination address or both of the received frames; b) one or more fields in the frames to be mirrored; c) performance; d) network or other security; and e) location of the mirror, destination of the mirroring or both.

Figure 13:
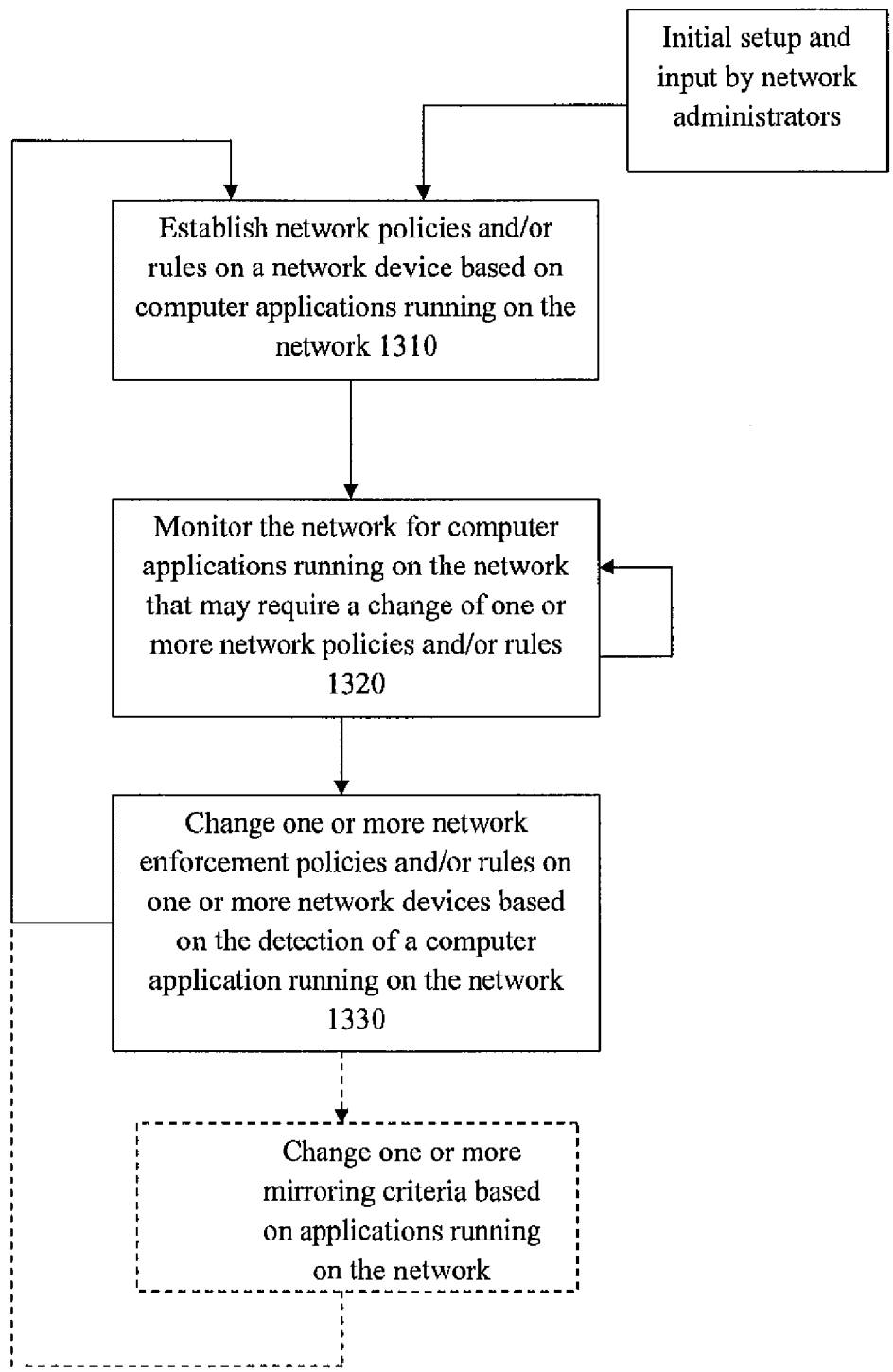
FIG. 13 is a simplified flow diagram of primary steps associated with a method for managing operations of a network based on the ability to identify computer applications running on the network.

As represented in FIG. 13, a method 1300 is provided for the management of operations of the network system 100. The method 1300 includes, after standard initial setup of one or more devices of the network infrastructure 101 through network administration input as is typically done in the field of the present invention, step 1310 of establishing on one or more packet forwarding devices of the network infrastructure 101 one or more network policies or rules implementing one or more network policies for forwarding frames of received packets based on computer applications running or attempting to run on the network system 100. Under step 1320, the network system 100 is monitored continuously for computer applications running on the network system 100 for those that may trigger one or more changes in the operations of one or more devices of the network infrastructure 101. It further includes step 1330 of changing one or more of the one or more of the enforcement policies or rules on one or more devices of the network infrastructure 101 based on the detection of one or more computer applications running on one or more of the plurality of devices of the network infrastructure 101. It is contemplated that the network manager is able to identify the applications running on the network system 100 based on one or more frames associated with the operation of the network system 100, such as by using the application identification function 200 described herein. The one or more network policies and/or rules include at least one of a set of ingress rules, egress rules, and mirroring rules. Step 1330 includes as an option for changing to change the mirroring of selectable frames of the received packets to the application identification appliance 180 of the network infrastructure 101. Further, the one or more policies to change may be one or more of, but not limited to: a) block a specific application flow; b) block an IP address; c) snipe a TCP connection; d) disable communication for an application; e) disable communications to an attached function; f) disable a network communication, in either or both of a forward path and a reverse path; g) bandwidth-limit an application by a particular user; h) bandwidth-limit an application for all users of the network system 100; i) log all application data; and j) honeypot the application flow.

Figure 14:
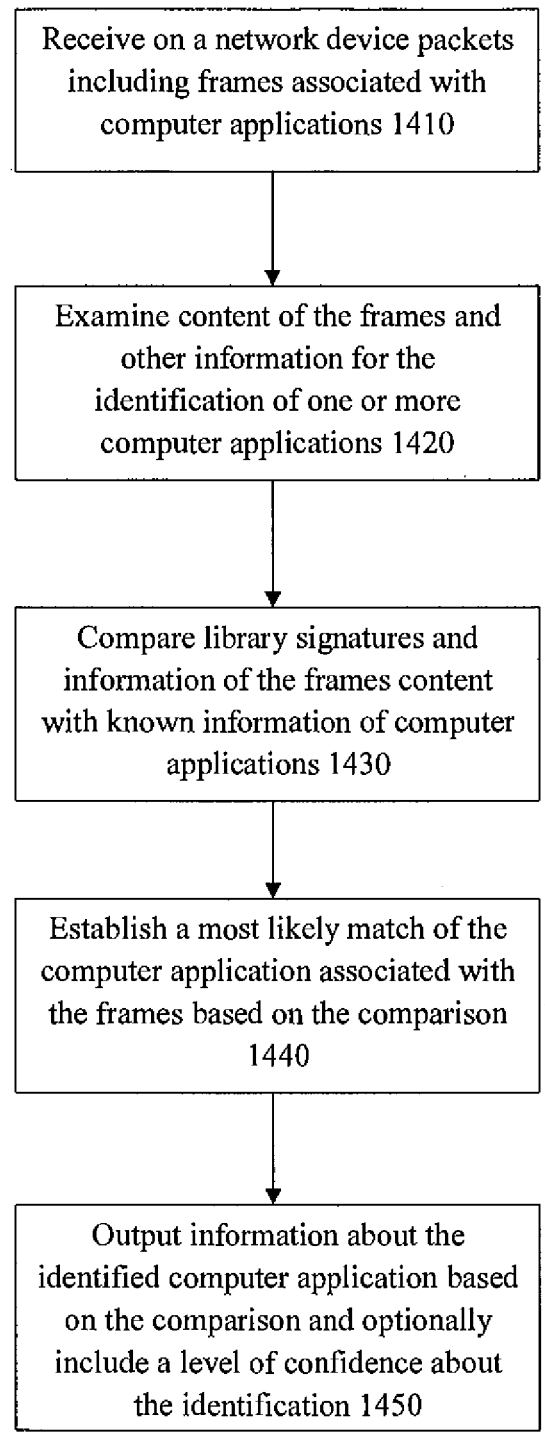
FIG. 14 is a simplified flow diagram of primary steps associated with a method for identifying computer applications running on a network.

As represented in FIG. 14, a method 1400 is provided for monitoring the network system 100 to identify one or more computer applications running on one or more network devices. The method 1400 includes a first step 1410 of receiving on a device of the network infrastructure 101 one or more packets containing one or more frames, wherein the one or more frames are associated with a computer application. Next, in step 1420, the content of the frames is examined for one or more signatures associated with the computer application and for other information obtained from one or more mechanisms. In step 1430, the examined content is compared with computer application information of the one or more signatures and the other information. In step 1440, a most likely match is established for the computer application associated with the one or more frames derived from the comparison. In step 1450, the match information is outputted representing an indication of a likely computer application associated with the examined frames based on the comparison. The information about the likely match may include a level of confidence in the indication. Optionally under the method 1400, the information from the mechanisms may be weighted. The method 1400 further includes the optional steps of: a) scoring the comparison to assess the likely accuracy of the correlation between the computer application identified by the one or more signatures comparison and the other information; and b) generating a single output with an identification of the likely computer application associated with the received one or more frames. The method 1400 may also include the step of adding one or more other mechanisms, including custom mechanisms, as part of the comparison. The other mechanisms may be provided through an application programming interface. The step 1450 of outputting the information may be carried out by transmitting the identification of the likely computer application to a network control manager.

Figure 15:
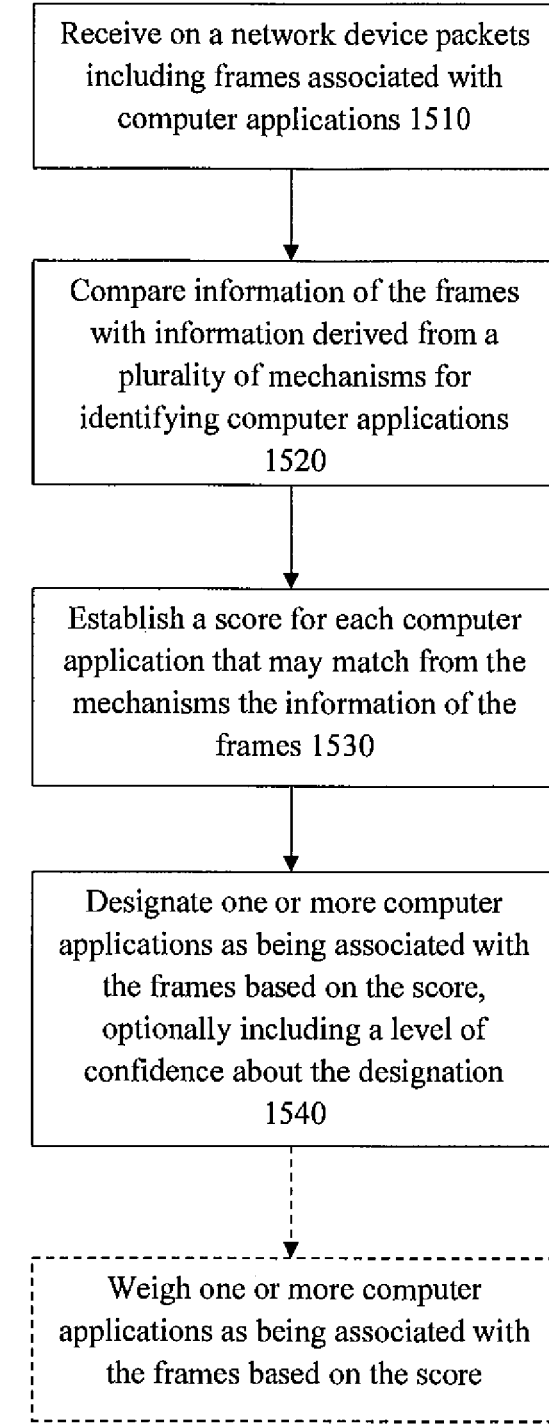
FIG. 15 is a simplified flow diagram of primary steps associated with a scoring method for assessing the accuracy of the identification of computer applications running on a network.

As represented in FIG. 15, a method 1500 is provided for identifying one or more computer applications running or attempting to run on the network system 100. The method 1500 includes step 1510 of first receiving information of one or more frames forwarded by one or more devices of the network infrastructure 101, wherein the information is indicative of one or more computer applications. Step 1520 involves comparing information of one or more frames forwarded with information of a computer applications identification database. The information of the database is obtained through multiple mechanisms. In step 1530, the information is used to establish a score for each computer application that may match the received information of the one or more frames. Finally, under step 1540, one or more computer applications are designated as being associated with the one or more frames based on the established score. The designation information provided optionally includes an indication of the confidence in the designation. An optional step of the method 1500 is to weight the likely accuracy of the one or more indicators in the comparison. The indicators may not be weighted equally. The mechanisms used to establish the computer applications information includes, but is not limited to: a) computer application signatures; b) TCP/UDP canonical port value; c) IP protocol value; d) heuristics; e) regular expression; f) history; g) applications installed on the network; and h) statistics. The method 1500 optionally includes the step of establishing the score by combining scores for each type of received information. The history and installed applications mechanisms, for example, may be used to weight the reliability of the information obtained from the other mechanisms.

A number of examples to help illustrate the invention have been described. Nevertheless, it will be understood that various modifications may be made without departing from the spirit and scope of the invention. Accordingly, other embodiments are within the scope of the claims appended hereto.

What is claimed is:

1. A method of controlling dynamic traffic mirrors of a network system including a plurality of network infrastructure devices, the method comprising the steps of:
    a. executing, using a hardware processor of a network infrastructure device of the plurality of network infrastructure devices, one or more traffic mirror policies including a policy to mirror network traffic to an application identification appliance that is configured to:
        compare received information with information of a computer applications identification database obtained from a plurality of mechanisms and designate a computer application as running on the network system based on the comparison,
    wherein the network infrastructure device is a switch or a router having one or more portals for receiving network traffic and one or more portals for transmitting network traffic to the application identification appliance;
    b. monitoring, using the hardware processor, events, topology and status of the network system; and
    c. automatically installing, enabling, selecting or changing, using the hardware processor, one or more of the traffic mirror policies based on the monitoring to change the mirroring of network traffic to the application identification appliance to protect the network system from harm associated with one or more designated computer applications running on the network system as a result of the comparison by the application identification appliance.

2. The method of claim 1 wherein one or more of the one or more traffic mirror policies provided, installed, enabled, selected or changed implement one or more network policies of the network system and/or one or more rules based on one or more network policies.

3. The method of claim 2 further comprising the step of establishing one or more criteria for the providing, installing, enabling, selecting or changing of the one or more traffic mirror policies based on the one or more network policies of the network system and/or the one or more rules based on one or more network policies.

4. The method of claim 1 further comprising the step of establishing one or more criteria for the providing, installing, enabling, selecting or changing of the one or more traffic mirror policies.

5. The method of claim 4 further comprising the step of selecting one or more of the plurality of network infrastructure devices from which to mirror the network traffic based on one or more of the one or more criteria.

6. The method of claim 5 further comprising the step of selecting a destination for the mirrored traffic based on one or more of the one or more criteria.

7. The method of claim 6 wherein the destination may be one or more of:
    a. one or more of the plurality of network infrastructure devices;
    b. one or more network services;
    c. a function of the network system; and
    d. a portal.

8. The method of claim 7 further comprising the step of selecting a portion of the network traffic to mirror, wherein the selected portion may be any one of:
    a. a flow of packets;
    b. a set of packets within a flow; and
    c. a portion of one or more frames of one or more packets within a flow.

9. The method of claim 8 wherein the portion of the network traffic selected for mirroring is selected based on one or more of the one or more criteria.

10. The method of claim 8 further comprising the step of determining when to stop the mirroring of the network traffic.

11. The method of claim 10 wherein the stopping is determined based on one or more of:
    a. one or more of the one or more criteria;
    b. one or more traffic mirror policies or one or more network policies; and
    c. one or more priorities of one or more other network traffic flows.

12. The method of claim 1 wherein the events monitored include one or more of:
    a. traffic loads;
    b. time of the day;
    c. link outages and other bandwidth constraints of the network system;
    d. location and status of one or more of the plurality of network infrastructure devices;
    e. number of attached functions attached to the network system;
    f. usage and numbers of wireless access points of the network system;
    g. mirrored network traffic;
    h. IDS and other security events;
    i. identification of a computer application running on the network system; and
    j. triggers.

13. The method of claim 1 further comprising the step of securing the network traffic to be mirrored prior to mirroring.

14. The method of claim 13 wherein the step of securing is provided by one or more of:
    a. a tunnel;
    b. encrypting the content of the network traffic; and
    c. an encrypted tunnel.

15. The method of claim 1 further comprising the step of securing the network traffic by including a security mechanism as part of the mirror.

16. The method of claim 1 wherein one of the one or more traffic mirror policies is to allow a source of the mirrored network traffic to choose the destination of that mirrored network traffic.

17. The method of claim 1 wherein one of the traffic mirror policies is to mirror selectable network traffic based on an attached function or user generating the network traffic to be mirrored or content of the network traffic to be monitored.

18. The method of claim 1 further comprising the step of storing the one or more traffic mirror policies in the plurality of network infrastructure devices and wherein the stored one or more mirror policies may be changed.

19. The method of claim 1 wherein the one or more traffic mirror policies are based on one or more of:
   a. a role of an authenticated user of the network system;
   b. a device using the network system;
   c. a type of a device using the network system;
   d. local packet classification;
   e. time of day;
   f. other events which may be monitored; and
   g. network policies.

20. A device of a network system including a plurality of network infrastructure devices, wherein the device is a switch or a router comprising:
   a. one or more portals configured to receive packets including frames and to send frames to one or more other network infrastructure devices including one or more application identification appliances configured to compare received information with information of a computer applications identification database obtained from a plurality of mechanisms and designate a computer application as running on the network system based on the comparison; and
   b. a traffic mirroring function including one or more portals for mirroring selectable ones of the frames of the received packets and to mirror the selectable ones of the frames of the received packets to one or more other devices of the network system, wherein the device is configured to store thereon one or more mirror policies for mirroring network traffic, to carry out traffic mirroring activity according to the one or more mirror policies and to change the one or more mirror policies to change the mirroring of network traffic to the one or more application identification appliances to protect the network system from harm associated with one or more designated computer applications running on the network system as a result of the comparison by the one or more application identification appliances.

21. The device of claim 20 wherein the change of the one or more mirror policies includes changing one or more of:
   a. the one or more portals;
   b. one or more configurations of the one or more portals;
   c. the frames of the received packets to mirror;
   d. a portion of the selectable ones of the frames to be mirrored;
   e. where to mirror the frames; and
   f. when to stop the mirroring.

22. The device of claim 21 wherein the one or more portals is one or more of the one or more ports of the device.

23. The device of claim 21 wherein the one or more mirror policies include one or more of:
   a. where to mirror the frames;
   b. which frames to mirror;
   c. which portions of frames to mirror;
   d. when to stop mirroring;
   e. frame mirroring based on criteria of the user and device sourcing the received traffic; and
   f. frame mirroring based on criteria of the network system.

24. The device of claim 21 wherein a mirror policy change is made based on one or more of:
   a. traffic loads at selectable packet forwarding devices of the network infrastructure;
   b. time of the day;
   c. link outages and other bandwidth constraints of the network infrastructure;
   d. location and status of the network policy controller;
   e. number of attached functions attached to the network system;
   f. usage and numbers of wireless access points of the network infrastructure; and
   g. triggers.

25. The device of claim 24 wherein the one or more mirror policies for mirroring the selectable ones of the frames are established based on one or more of:
   a. roles of users attached to the network infrastructure;
   b. services available through the network infrastructure devices;
   c. time period of usage of the services;
   d. applications used on the network infrastructure devices; and
   e. history of network use.

26. The device of claim 20 wherein the device is a switch.

27. The device of claim 20 wherein at least one of the one or more portals is a tunnel to another device of the network infrastructure.

28. The device of claim 20 wherein the one or more mirror policies are provided to the device by a network policy controller.

29. The device of claim 20 wherein at least one of the one or more portals includes a data link layer encapsulation for the received frames to be mirrored.

30. The device of claim 20 wherein the one or more portals or a type of the one or more portals is selectable based on one or more of:
   a. source, destination or both of the received frames;
   b. one or more fields in the frames to be mirrored;
   c. performance;
   d. security; and
   e. location of the mirror, destination of the mirroring or both.

* * * * *